US010781904B2

(12) United States Patent
Hirota et al.

(10) Patent No.: US 10,781,904 B2
(45) Date of Patent: Sep. 22, 2020

(54) DIFFERENTIAL APPARATUS

(71) Applicant: GKN Driveline Japan Ltd., Tochigi (JP)

(72) Inventors: Isao Hirota, Tochigi (JP); Yousuke Kawai, Tochigi (JP); Noboru Higano, Tochigi (JP); Kazutaka Kawata, Tochigi (JP)

(73) Assignee: GKN Automotive Ltd., Birmingham, West Midlands (GB)

( * ) Notice: Subject to any disclaimer, the term of this patent is extended or adjusted under 35 U.S.C. 154(b) by 81 days.

(21) Appl. No.: 16/179,053

(22) Filed: Nov. 2, 2018

(65) Prior Publication Data

US 2019/0219143 A1 Jul. 18, 2019

(30) Foreign Application Priority Data

Jan. 15, 2018 (JP) .................................. 2018-004175
Jan. 15, 2018 (JP) .................................. 2018-004181

(51) Int. Cl.
| F16H 48/14 | (2006.01) |
| F16H 48/20 | (2012.01) |
| F16H 48/08 | (2006.01) |
| F16H 48/40 | (2012.01) |
| B60K 17/16 | (2006.01) |
| B60K 23/04 | (2006.01) |

(52) U.S. Cl.
CPC ............ *F16H 48/14* (2013.01); *F16H 48/08* (2013.01); *F16H 48/20* (2013.01); *F16H 48/40* (2013.01); *B60K 17/16* (2013.01); *B60K 23/04* (2013.01)

(58) Field of Classification Search
None
See application file for complete search history.

(56) References Cited

U.S. PATENT DOCUMENTS

| 2,971,404 | A | * | 2/1961 | Thornton | ................. | F16H 48/22 |
| | | | | | | 475/235 |
| 3,027,781 | A | * | 4/1962 | O'Brien | ................. | F16H 48/08 |
| | | | | | | 475/231 |
| 6,413,183 | B1 | * | 7/2002 | Ishikawa | ................. | F16H 48/08 |
| | | | | | | 475/160 |
| 2009/0197732 | A1 | * | 8/2009 | Lyman | .................. | F16H 48/142 |
| | | | | | | 475/235 |
| 2017/0356538 | A1 | * | 12/2017 | Cheng | ..................... | F16H 48/24 |

FOREIGN PATENT DOCUMENTS

| FR | 2604504 A1 | * | 4/1988 | ............. F16H 48/22 |
| JP | H09-049560 A | | 2/1997 | |

* cited by examiner

*Primary Examiner* — Timothy Hannon
(74) *Attorney, Agent, or Firm* — Bejin Bieneman PLC

(57) ABSTRACT

A differential apparatus includes a differential device, and a differential restricting portion configured to restrict a differential operation of the differential device. The differential device includes a differential case which is rotatably disposed, a differential gear which is rotatable while being supported by the differential case and revolves by rotation of the differential case, and a pair of output gears which are meshed with the differential gear and are rotatable relative to each other. The output gears include a gear member provided with a gear portion, and an output member including an output portion configured to output a driving force inputted to the output gears. A cam portion is provided between the gear member and the output member. The differential restricting portion is provided between the differential case and the output member.

12 Claims, 19 Drawing Sheets

DIFFERENTIAL APPARATUS

CROSS-REFERENCE TO RELATED APPLICATIONS

This application is based on and claims priority under 35 USC 119 from Japanese Patent Application No. 2018-004175 filed on Jan. 15, 2018 and Japanese Patent Application No. 2018-004181 filed on Jan. 15, 2018, the contents of each of which are incorporated herein by reference in their entireties.

TECHNICAL FIELD

The present disclosure relates to a differential apparatus to be applied to a vehicle.

BACKGROUND

JP-A-09-049560 discloses a differential apparatus. The differential apparatus in JP-A-09-049560 includes a differential device and a differential restricting portion. The differential device includes a differential case disposed rotatably, a pinion as a differential gear, and side gears as a pair of output gears. The pinion is rotatable while being supported by the differential case and revolves by rotation of the differential case. The pair of side gears are meshed with the pinion and are rotatable relative to each other. The differential restricting portion is provided between the differential case and the side gears and restricts the differential operation of the differential device.

In the differential apparatus in JP-A-09-049560, a tapered plate is connected to the pair of side gears via a helical spline portion as a cam portion. The tapered plate is provided with a cone clutch as a differential restricting portion.

In the differential apparatus in JP-A-09-049560, the tapered plate is moved in an axial direction by a meshing reaction force between the pinion and the pair of side gears, and the axial movement of the tapered plate is strengthened by the helical spline portion, so that the differential restricting force of the cone clutch is enhanced.

However, in the differential apparatus in JP-A-09-049560, the differential restricting force generated by the differential restricting portion is outputted from the tapered plate to the pair of output gears via the cam portion.

In such transmission of the differential restricting force, vibration generated in the cam portion is easily transmitted to a friction surface. Therefore, there is a concern that the differential restricting property may be adversely affected by the vibration, responsiveness, and the like.

In addition, in the differential apparatus in JP-A-09-049560, the helical spline portion provided between the side gear and the tapered plate is disposed so as to project to an axial outer side of the gear portion of the side gear. Therefore, the differential apparatus in JP-A-09-049560 is large in the axial direction.

SUMMARY

According to illustrated embodiments, a differential apparatus includes a differential device and a differential restricting portion configured to restrict a differential operation of the differential device. The differential device includes a differential case which is rotatably disposed, a differential gear which is rotatable while being supported by the differential case and revolves by rotation of the differential case, and a pair of output gears which are meshed with the differential gear and are rotatable relative to each other. The output gears include a gear member provided with a gear portion, and an output member including an output portion configured to output a driving force inputted to the output gear. A cam portion is provided between the gear member and the output member. The differential restricting portion is provided between the differential case and the output member.

In this differential apparatus, because the differential restricting portion is provided between the differential case and the output member, a differential restricting force generated by the differential restricting portion is transmitted to the output portion without passing through the cam portion.

Therefore, in such a differential apparatus, the vibration generated at the cam portion is not added to the differential restricting force, the responsiveness of the driving force can be improved, and the differential restricting property can be stabilized.

In addition, the cam portion may be disposed on an inner diameter side of the gear portion of the output gear.

When the cam portion is disposed on the inner diameter side of the gear portion of the output gear, the cam portion is not disposed on an axially outer side of the gear portion of the output gear, and the apparatus can be downsized in an axial direction.

Therefore, in such a differential apparatus, the cam portion is prevented from projecting to the axially outer side of the gear portion of the output gear, and the apparatus can be downsized.

According to illustrated embodiments, the differential restricting property of the differential apparatus is stabilized.

In addition, according to illustrated embodiments, the differential apparatus would be downsized.

DESCRIPTION

Figure 1:
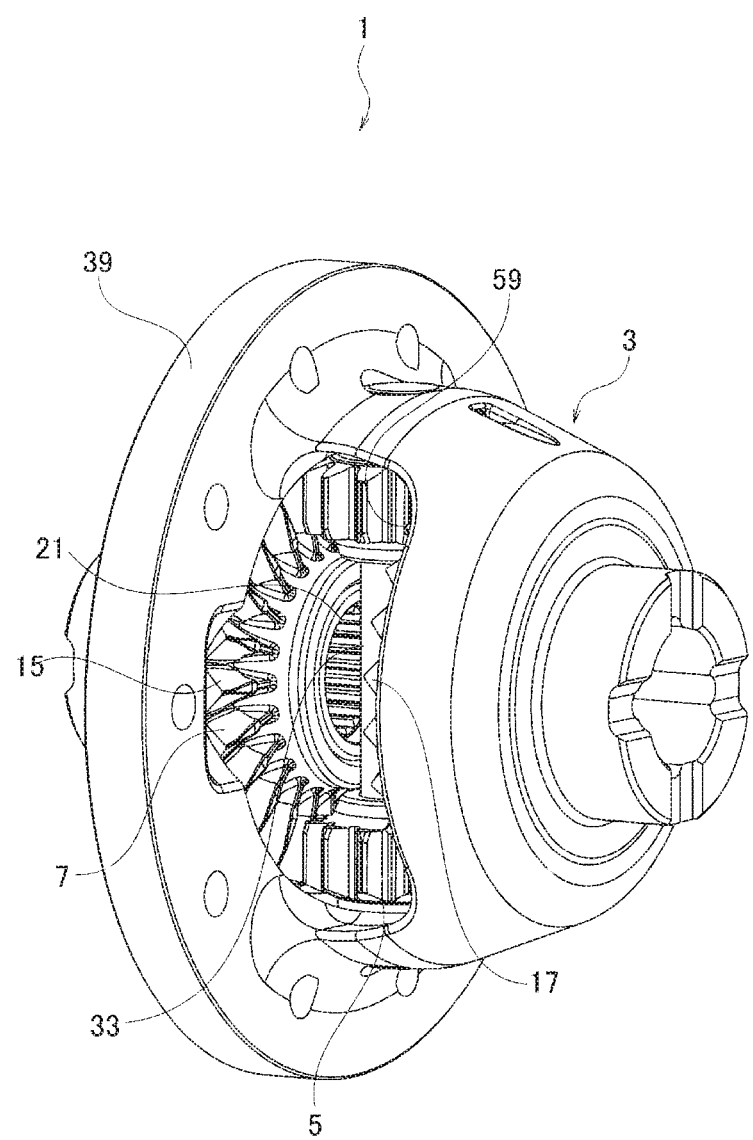
FIG. 1 is a perspective view of a differential apparatus according to a first embodiment.
Figure 2:
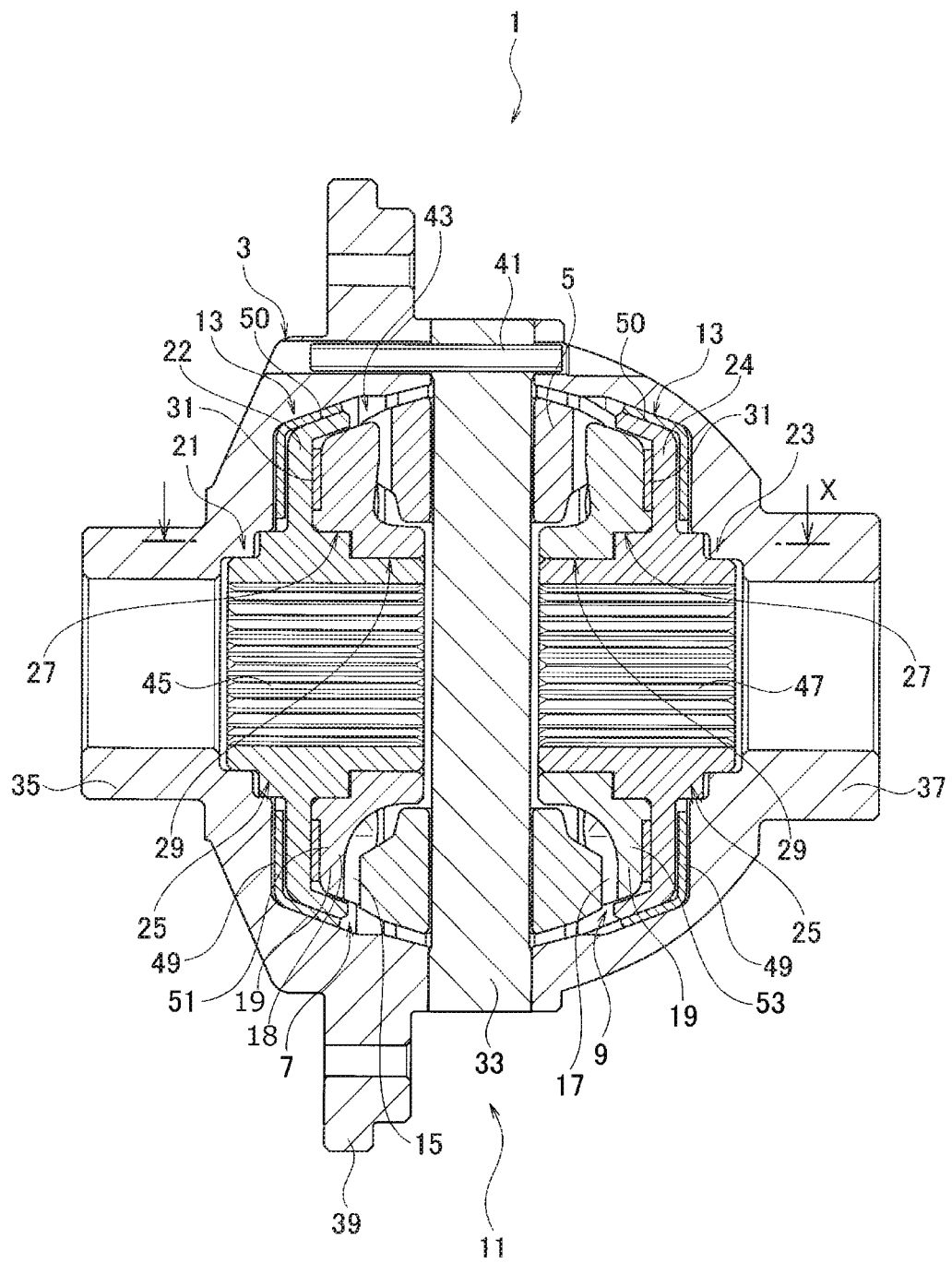
FIG. 2 is a cross sectional view of the differential apparatus according to the first embodiment.
Figure 3:
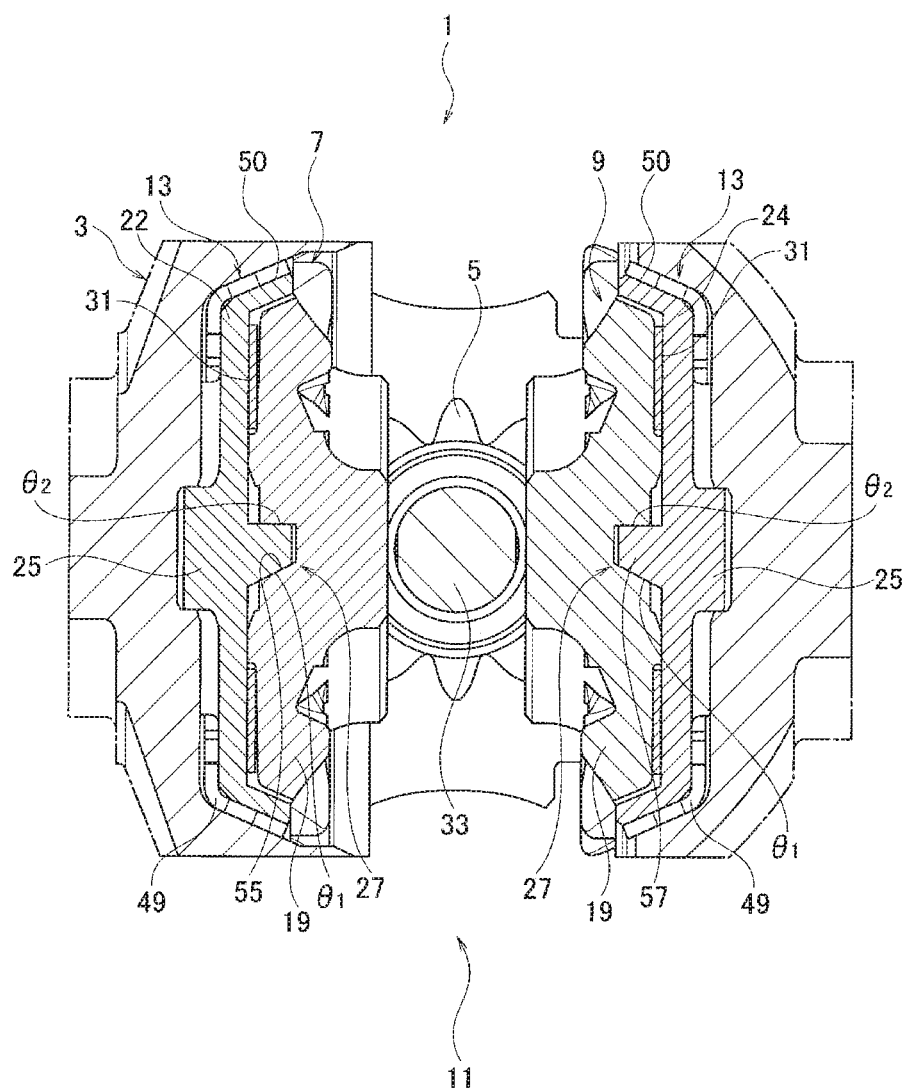
FIG. 3 is a cross sectional view along a line X-X in FIG. 2.

A differential apparatus according to embodiments will be described with reference to FIGS. 1 to 19.

(First Embodiment)

A first embodiment will be described with reference to FIGS. 1 to 5.

A differential apparatus 1 according to the first embodiment includes a differential case 3 which is rotatably disposed, a pinion 5, as a differential gear, which is rotatable while being supported by the differential case 3 and revolves by rotation of the differential case 3, a differential device 11 which includes side gears 7, 9, as a pair of output gears, meshed with the pinion 5 and rotatable relative to each other, and a differential restricting portion 13 which restricts a differential operation of the differential device 11 provided between the differential case 3 and the side gears 7, 9.

The differential apparatus 1 includes a cam portion 27 configured to operate the differential restricting portion 13 with a driving force inputted to the pair of side gears 7, 9. The cam portion 27 is disposed on inner diameter sides of gear portions 15, 17 of the pair of side gears 7, 9.

The cam portion 27 is disposed on outer diameter sides of output portions 21, 23 at an axial intermediate position of the output portions 21, 23 of the pair of side gears 7, 9.

Flange portions 51, 53 extending in a radial direction are provided on rear sides of the gear portions 15, 17 of the pair of side gears 7, 9. The flange portions 51, 53 are disposed on an outer diameter side of the cam portion 27.

The pair of side gears 7, 9 include a gear member 19 and an output member 25. The gear member 19 is provided with the gear portions 15, 17. The output member 25 includes the output portions 21, 23 configured to output a driving force inputted to the side gears 7, 9.

The cam portion 27 is provided between the gear member 19 and the output member 25. The cam portion 27 engages with the gear member 19 and the output member 25 rotatably and integrally. In addition, the cam portion 27 moves the output member 25 in the axial direction by a rotational torque inputted to the side gears 7, 9 and increases the differential restricting force of the differential restricting portion 13.

The cam portion 27 engages the gear member 19 with the output member 25 rotatably and integrally.

The differential restricting portion 13 is provided between the differential case 3 and the output member 25.

A support portion 29 configured to support the gear member 19 and the output member 25 in the radial direction is provided between the gear member 19 and the output member 25.

An urging (biasing) member 31 configured to urge the gear member 19 and the output member 25 in the axial direction is disposed between the gear member 25 and the output member 19.

The differential case 3 is formed of a continuous member.

The pinion 5 and the pair of side gears 7, 9 are configured by a face gear group.

As shown in FIGS. 1 to 5, the differential device 11 includes the differential case 3, a pinion shaft 33, the pinion 5, and the pair of side gears 7, 9.

The differential case 3 is rotatably supported by a stationary member (not shown) such as a carrier via bearings (not shown) at an outer circumference of each of the boss portions 35, 37 formed on both sides in the axial direction.

The differential case 3 is formed with a flange portion 39 to which a ring gear (not shown) is fixed, the ring gear meshes with a power transmission gear (not shown) configured to transmit the driving force, and the driving force is transmitted to rotationally drive the differential case 3.

In such a differential case 3, the pinion shaft 33, the pinion 5, and the pair of side gears 7, 9 are accommodated and disposed.

An end portion of the pinion shaft 33 is engaged with a hole formed in the differential case 3, and is prevented from escaping and prevented from rotating by a pin 41. The pinion shaft 33 is rotationally driven integrally with the differential case 3.

The pinion 5 is supported at both axial end sides of the pinion shaft 33.

A plurality of (here, two) pinions 5 are disposed at equal intervals in a circumferential direction of the differential case 3. Each of the plurality of pinions 5 is supported on a shaft end side of the pinion shaft 33 and revolves by the rotation of the differential case 3.

The pinion 5 transmits the driving force to the pair of side gears 7, 9. In addition, the pinion 5 is rotatably supported on the pinion shaft 33, and when differential rotation occurs between the pair of side gears 7, 9 meshing with each other, the pinion 5 is rotationally driven.

Three, four or more pinions 5 may be disposed at equal intervals in the circumferential direction of the differential case 3, and the pinion 5 may not be rotatably supported by the pinion shaft 33 but may be directly supported on an inner circumferential surface side of the differential case 3.

The pair of side gears 7, 9 are accommodated in the differential case 3 in a relatively rotatable manner. The gear portions 15, 17 of the side gears 7, 9 and the gear portion of the pinion 5 configure a meshing portion 43, and the gear portions 15, 17 of the side gears 7, 9 and the gear portion of the pinion 5 mesh with each other by the meshing portion 43.

The pair of side gears 7, 9 include the output portions 21, 23. Spline-shaped connecting portions 45, 47 are formed on inner circumferential sides of the output portions 21, 23. A drive shaft (not shown) connected to an output side member is connected to the side gears 7, 9 via the connecting portions 45, 47, so as to be integrally rotatable with the side gears 7, 9. The side gears 7, 9 output to the output side member the driving force inputted to the differential case 3.

The differential restricting portion 13 configured to restrict the differential operation of the differential device 11 is provided between the pair of side gears 7, 9 and the differential case 3.

The differential restricting portion 13 includes tapered rings 49, 49 as sliding friction members engaged with the differential case 3 rotatably and integrally.

A plurality of projected portions formed on inner circumferential sides of the tapered rings 49, 49 are engaged with recessed portions formed in an inner wall surface of the differential case 3, so that the tapered rings 49, 49 and the differential case 3 rotate integrally with each other.

A meshing reaction force is generated between the pair of side gears 7, 9 and the pinion 5 according to the magnitude of the driving force (rotational torque) inputted to the differential case 3. When the pair of side gears 7, 9 move in the axial direction by this meshing reaction force, the tapered rings 49, 49 have slide friction with the pair of side gears 7, 9.

The friction torque is transmitted between the differential case 3 and the pair of side gears 7, 9 via the tapered rings 49, 49, and the differential operation of the differential device 11 is restricted according to the friction torque.

The differential restricting portion 13 is a torque sensitive cone clutch which generates a friction torque according to the magnitude of the driving torque inputted to the differential case.

The pair of side gears 7, 9 configured to operate the differential restricting portion 13 are configured by the gear member 19 and the output member 25.

Figure 4:
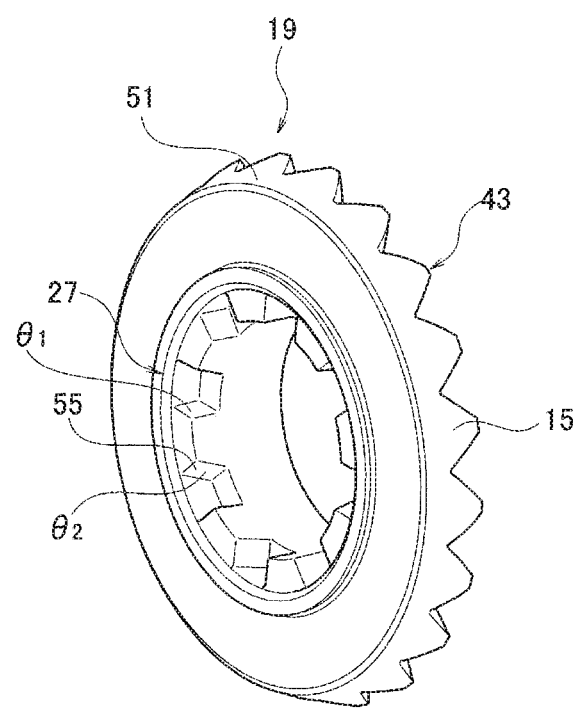
FIG. 4 is a perspective view of a gear member of the differential apparatus according to the first embodiment.

The gear member 19 is formed in an annular shape, and the gear portions 15, 17 (only a side gear 7 side is shown in FIG. 4) are formed on an outer circumference side. The gear portions 15, 17 configure the meshing portion 43 with the gear portion of the pinion 5.

The "gear portion" in the present embodiment includes gear teeth from the tooth bottom to the tooth tip and an annular base portion 18 connecting the tooth bottoms of the respective gear teeth.

The meshing portion 43 including the gear portions 15, 17 of the gear member 19 and the gear portion of the pinion 5 is configured by a face gear group.

Accordingly, the meshing portion 43 of the gear is configured by a face gear group, and thereby the pinion 5 and the pair of side gears 7, 9 can be disposed closer to each other in the axial direction as compared with a case where the meshing portion 43 is configured by a bevel gear group. As a result, the differential apparatus can be downsized in the axial direction.

On the gear member 19, the flange portions 51, 53 linearly extending in the radial direction in a shape including the base portion 18 are provided on the rear sides of the gear portions 15, 17. The strength of a tooth bottom side of the gear portions 15, 17 is improved by the flange portions 51, 53, and thus the strength of the side gears 7, 9 is improved.

Figure 5:
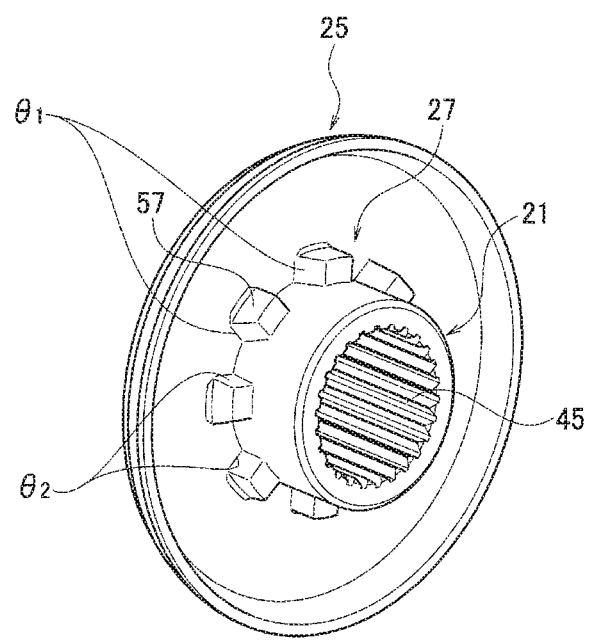
FIG. 5 is a perspective view of an output member of the differential apparatus according to the first embodiment.

The output member 25 is formed in a concave annular shape such that the output member 25 and the gear member 19 can be disposed in the axial direction close to each other, and a part of the gear member 19 in the axial direction is accommodated in the output member 25. The output portions 21, 23 (only the side gear 7 side is shown in FIG. 5) are provided on an inner circumferential side of the output member 25. The connecting portions 45, 47 configured to output the driving force transmitted to the pair of side gears 7, 9 are formed on the output portions 21, 23.

Flange portions 22, 24 extending at the outer diameter side from the output portions 21, 23 are provided on the output portion 25. The flange portions 22, 24 include sliding surfaces 50, 50 opposed to the tapered rings 49, 49. According to the rotational state of the differential device 11, the sliding surfaces 50, 50 slide with the tapered rings 49, 49. The sliding surfaces 50, 50 and the tapered rings 49, 49 configure the differential restricting portion 13.

The cam portion 27 is provided between the output member 25 and the gear member 19 in the axial direction. The cam portion 27 has a function of converting a rotational torque into an axial thrust force.

The cam portion 27 includes a plurality of engagement recessed portions 55 provided on the inner circumferential side of the gear member 19 and a plurality of engagement projected portions 57 provided on the outer circumferential side of the output portions 21, 23 of the output member 25. The plurality of engagement projected portions 57 can be engaged with the plurality of engagement recessed portions 55.

In the cam portion 27, when the plurality of engagement projected portions 57 are engaged with the plurality of engagement recessed portions 55, the gear member 19 and the output member 25 can be integrally rotated.

In the cam portion 27, engagement surfaces in the rotational direction of the plurality of engagement recessed portions 55 and the plurality of engagement projected portions 57 form cam surfaces which are inclined by a predetermined angle. When a driving force (rotational torque) is inputted to the differential case 3 and the driving force is branched and inputted to the pair of side gears 7, 9 via the pinion 5, the cam portion 27 operates to move the output members 25, 25 to the axially outer side.

An inclination angle $\theta 1$ is given to the cam surface on a forward rotation side (drive rotation side in a vehicle forward direction) in the rotational direction of the engagement recessed portions 55 and the engagement projected portions 57, and an inclination angle $\theta 2$ is given to the cam surface on a reverse rotational side (drive rotation side in a vehicle backward direction). The cam surface on the forward rotation side of the engagement recessed portions 55 and the cam surface on the forward rotation side of the engagement projected portions 57 face each other and can engage with each other. The cam surface on the reverse rotation side of the engagement recessed portions 55 and the cam surface on the reverse rotation side of the engagement projected portions 57 face each other and can engage with each other.

The inclination angle $\theta 1$ on the forward rotation side (drive rotation side in the vehicle forward direction) in the rotational direction of the cam surface is set such that when the vehicle moves forward, the cam portion 27 generates a large cam thrust force according to the driving force and increases the differential restricting force in the differential restricting portion 13. The inclination angle $\theta 2$ on the reverse rotation side (drive rotation side in a vehicle backward direction) of the cam surface is set such that the engagement surfaces in the rotational direction of the plurality of engagement recessed portions 55 and the plurality of engagement projected portions 57 are inclined at an inclination angle ($\theta 2$) or zero degree smaller than the predetermined angle ($\theta 1$). Therefore, when the driving rotation in a direction in which the vehicle moves backward to the differential case 3 occurs, the generation of the cam thrust force by the cam surface is suppressed. As a result, the differential apparatus of the present embodiment has a driving force transfer property similar to that of a differential apparatus having no differential restricting force.

Accordingly, by setting the inclination angles $\theta 1$ and $\theta 2$ of the cam surfaces to be different on the forward rotation side and the reverse rotation side, the differential apparatus can have asymmetrical differential restricting forces according to the vehicle setting.

Due to the axial movement of the output members 25, 25 caused by generating the axial cam thrust force according to the inclination angle of the cam surface, the sliding frictional force between the sliding surfaces 50, 50 of the pair of side gears 7, 9 and the tapered rings 49, 49 is strengthened, and the differential restricting force at the differential restricting portion 13 is increased or strengthened.

The cam portion 27 is disposed on the inner diameter sides of gear portions 15, 17 of the pair of side gears 7, 9.

Specifically, when the gear portions 15, 17 of the side gears 7, 9 and the cam portion 27 are viewed from the radial direction, at least a part of axial positions of the gear portions 15, 17 of the side gears 7, 9 and an axial position of the cam portion 27 are disposed to overlap in the radial direction.

Accordingly, by disposing the cam portion 27, the cam portion 27 does not project to the axially outer side of the meshing portion 43 of the gear, and upsizing of the differential apparatus in the axial direction is suppressed.

The cam portion 27 may be provided on either one of the pair of side gears 7, 9.

In addition, the flange portions 51, 53 of the side gears 7, 9 are disposed on the outer diameter side of the cam portion 27.

Specifically, when the flange portions 51, 53 of the side gears 7, 9 and the cam portion 27 are viewed from the radial direction, at least a part of axial positions of the flange portions 51, 53 of the side gears 7, 9 and an axial position of the cam portion 27 are disposed to overlap in the radial direction.

Accordingly, the side gears 7, 9 are reinforced by the flange portions 51, 53, and deformation of the cam portion 27 is prevented, by disposing the flange portions 51, 53 on the outer diameter side of the cam portion 27. As a result, the cam portion 27 can stably generate the cam thrust force.

Further, the cam portion 27 is disposed on the outer diameter sides of output portions 21, 23 at the axial intermediate position of the output portions 21, 23 of the pair of side gears 7, 9.

By disposing the cam portion 27 at the axially intermediate position of the output portions 21, 23, stress concentration at axial end portions of the cam portion 27 and the output portions 21, 23 is suppressed, and the strength and durability of the cam portion 27 is improved.

Due to the cam action of the cam portion 27 as described above, the output members 25, 25 of the pair of side gears 7, 9 moves to the axial outer side according to the relative rotational torque generated between the gear member 19 and the output member 25, and the differential restricting portions 13, 13 frictionally slide to generate a differential restricting force, so that the differential operation of the differential device 11 is restricted.

The driving force from the pair of side gears 7, 9 along with this differential restricting force is outputted from the output portions 21, 23 of the output members 25, 25 to the output side member.

Accordingly, the differential restricting portion 13 is provided on the output member 25 including the output portions 21, 23 configured to output the driving force, and thereby the cam portion 27 is not disposed in a path which transmits the differential restricting force from the differential restricting portion 13 to the output portions 21, 23, and a transmission path of the differential restricting force can be completed between the output member 25 and the differential case 3.

Therefore, the vibration in the cam portion 27 is not applied to the differential restricting force generated by the differential restricting portion 13, the driving force along with the differential restricting force can be transmitted from the output portions 21, 23 of the output member 25, so that the responsiveness of the driving force can be improved and differential restricting property can be stabilized.

Here, the support portion 29, which is configured to support the gear member 19 and the output member 25 in the radial direction and is provided between the gear member 19 and the output member 25, is provided adjacent to the cam portion 27 on an axial end portion side with a small diameter.

The support portion 29 is provided between an inner circumferential surface of the gear member 19 which opposes and comes into contact with the gear member 19 and the output member 25 in the radial direction and an outer circumferential surface of the output member 25. The support portion 29 supports, that is, is between the gear member 19 and the output member 25 in the radial direction.

The relative position between the gear member 19 and the output member 25 is stabilized, and the cam action of the cam portion 27 is stabilized by providing the support portion 29 between the gear member 19 and the output member 25.

The urging member 31 is disposed between the gear member 19 and the output member 25 in the axial direction.

The urging member 31 is selected from members having an elastic function in consideration of the disposition space and the set urging property. The urging member 31 may be a disc spring. The urging member 31 urges the gear member 19 to an axial inner side (a pinion 5 side), and urges the output member 25 to the axial outer side (a differential restricting portion 13 side).

By disposing the urging member 31 between the gear member 19 and the output member 25, a preload is applied to the differential restricting portion 13, and the response of the intermittent property of the differential restricting portion 13 can be improved.

In addition, by disposing the urging member 31 between the gear member 19 and the output member 25, axial backlashes of each member can be prevented, and the driving force transmission in the differential device 11 can be stabilized.

In a case where the meshing portion 43 of the gear is configured by a bevel gear group, there has conventionally been a configuration in which the rear sides (flange portions 51, 53 sides) of the gear portions 15, 17 of the gear member 19 are interposed in the circumferential direction to cover outer circumferences of the gear portions 15, 17.

In such a configuration, in a state where the pair of side gears 7, 9 are accommodated in the differential case 3, the pinion 5 cannot be assembled from an outer side of the differential case 3 to the pair of side gears 7, 9, and the differential case 3 has to be made into a divided structure.

In contrast, because the meshing portion 43 of the gear is configured by a face gear group and the flange portions 51, 53 positioned on the rear sides (tooth bottom sides) of the gear portions 15, 17 of the gear member 19 linearly extend in the radial direction, the rear sides of the gear portions 15, 17 of the gear member 19 are not interposed in the circumferential direction to cover the outer circumferences of the gear portions 15, 17.

Therefore, in a state where the pair of side gears 7, 9 are accommodated in the differential case 3, the pinion 5 can be assembled from the outer side of the differential case 3 to the pair of side gears 7, 9.

Thus, the differential case 3 has a one-piece structure formed of a continuous member, and an opening 59 capable of accommodating the pinion 5, the pair of side gears 7, 9, the tapered ring 49, or the like is provided in the outer circumference.

When assembling each member to the differential case 3, first, the tapered ring 49 and the pair of side gears 7, 9 are accommodated from the opening 59 and disposed at predetermined positions.

Next, one pinion 5 is assembled from the opening 59 to the pair of side gears 7, 9 so as to mesh with each other at the meshing portion 43. The assembled body is rotated by a predetermined angle in the differential case 3 and is assembled such that another pinion 5 meshes with the pair of side gears 7, 9 from the opening 59 at the meshing portion 43.

Subsequently, in the differential case 3, the assembly is rotated until the pinion 5 is positioned in a hole portion into which the pinion shaft 33 can be inserted, the pinion shaft 33 is inserted from the hole, and the pin 41 is inserted. As a result, the assembly is completed.

Accordingly, by making the differential case 3 be a one-piece structure, the number of parts of the differential case 3 can be reduced and the number of parts for combining the differential case 3 of the divided structure can also be reduced.

In such a differential apparatus 1, because the differential restricting portion 13 is provided on the output member 25 having the output portions 21, 23 engaged with the gear member 19 via the cam portion 27 rotatably and integrally, the differential restricting force generated by the differential restricting portion 13 is directly outputted from the output portions 21, 23 of the output member 25 without passing through the cam portion 27.

Therefore, in such a differential apparatus 1, the vibration generated in the cam portion 27 is not applied to the differential restricting force during a period when the differential restricting force is outputted from the output portions 21, 23, the transmission responsiveness of the driving force can be improved, and the differential restricting property can be stabilized.

In addition, because the support portion 29 configured to support the gear member 19 and the output member 25 in the radial direction is provided between the gear member 19 and the output member 25, the relative position of the gear member 19 and the output member 25 is stabilized and the cam action of the cam portion 27 can be stabilized.

Further, because the urging member 31 configured to urge the gear member 19 and the output member 25 in the axial direction is disposed between the gear member 19 and the output member 25, a preload or bias is applied to the differential restricting portion 13, and the response of the intermittent property of the differential restricting portion 13 can be stabilized.

In such a differential apparatus 1, because the cam portion 27 is disposed on the inner diameter sides of the gear portions 15, 17 of the pair of side gears 7, 9, the cam portion 27 is not disposed on the axially outer sides of the gear portions 15, 17 of the side gears 7, 9, and the differential apparatus 1 can be downsized in the axial direction.

Therefore, in such a differential apparatus 1, the cam portion 27 is prevented from projecting to the axially outer sides of the gear portions 15, 17 of the side gears 7, 9, and the differential apparatus 1 can be downsized.

In addition, because the cam portion 27 is disposed on the outer diameter sides of the output portions 21, 23 at the axial intermediate position of the output portions 21, 23 of the pair of side gears 7, 9, stress concentration at the cam portion 27 can be avoided and durability can be improved.

Further, because the flange portions 51, 53 of the pair of side gears 7, 9 are disposed on the outer diameter side of the cam portion 27, deformation of the cam portion 27 can be prevented and the generation of the cam thrust force of the cam portion 27 can be stabilized.

Furthermore, because the cam portion 27 engages the gear member 19 with the output member 25 rotatably and integrally, the driving force controlled by the differential restricting portion 13 can be directly outputted to the output member 25 and the power transmission in the differential device 11 can be stabilized.

Further, because the urging member 31 configured to press the differential restricting portion 13 is disposed between the pair of side gears 7, 9 and the differential case 3, a preload is applied to the differential restricting portion 13, and the response of the intermittent property of the differential restricting portion 13 can be stabilized.

In addition, because the urging member 31 configured to urge the gear member 19 and the output member 25 in the axial direction is disposed between the gear member 19 and the output member 25, axial backlashes of each member can be prevented, and the driving force transmission in the differential device 11 can be stabilized.

Further, because the differential case 3 is formed of a continuous member, the number of parts of the differential case 3 and the number of parts for combining the differential case 3 of the divided structure can be reduced.

Moreover, because the pinion 5 and the pair of side gears 7, 9 are configured by a face gear group, the meshing portion 43 of the gear can be downsized in the axial direction.

(Second Embodiment)

A second embodiment will be described with reference to FIGS. 6 and 7.

In a differential apparatus 101 according to the second embodiment, between the gear member 19 and the output member 25, a cam portion 103 configured to engage the gear member 19 and the output member 25 rotatably and integrally, and to operate the differential restricting portion 13 to move the output member 25 in the axial direction by the rotation of the side gears 7, 9 is provided.

The output portion 25 is provided with the differential restricting portion 13.

In addition, a thrust block 105 configured to receive a cam thrust reaction force of the cam portion 103 is disposed between the pair of side gears 7, 9.

The same reference numerals are used for the same components as those of the first embodiment, and the description of the function refers to the first embodiment. Because the configuration is the same as that of the first embodiment, the operation and effect obtained are equivalent.

Figure 6:
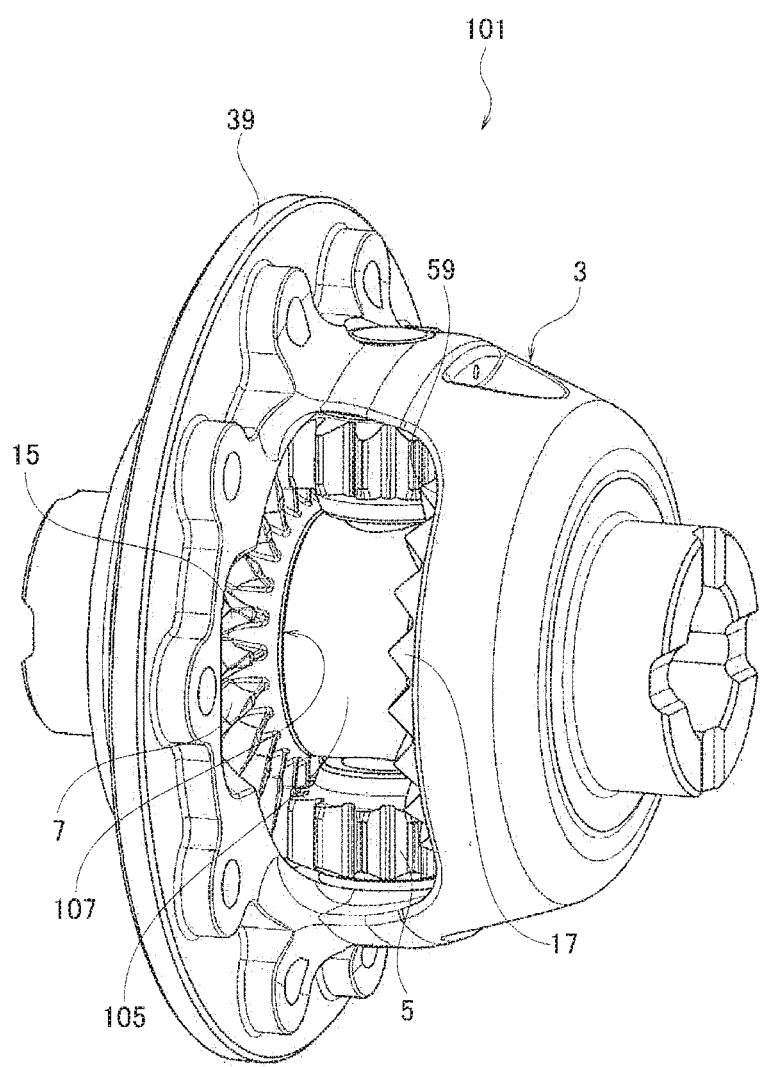
FIG. 6 is a perspective view of a differential apparatus according to a second embodiment.
Figure 7:
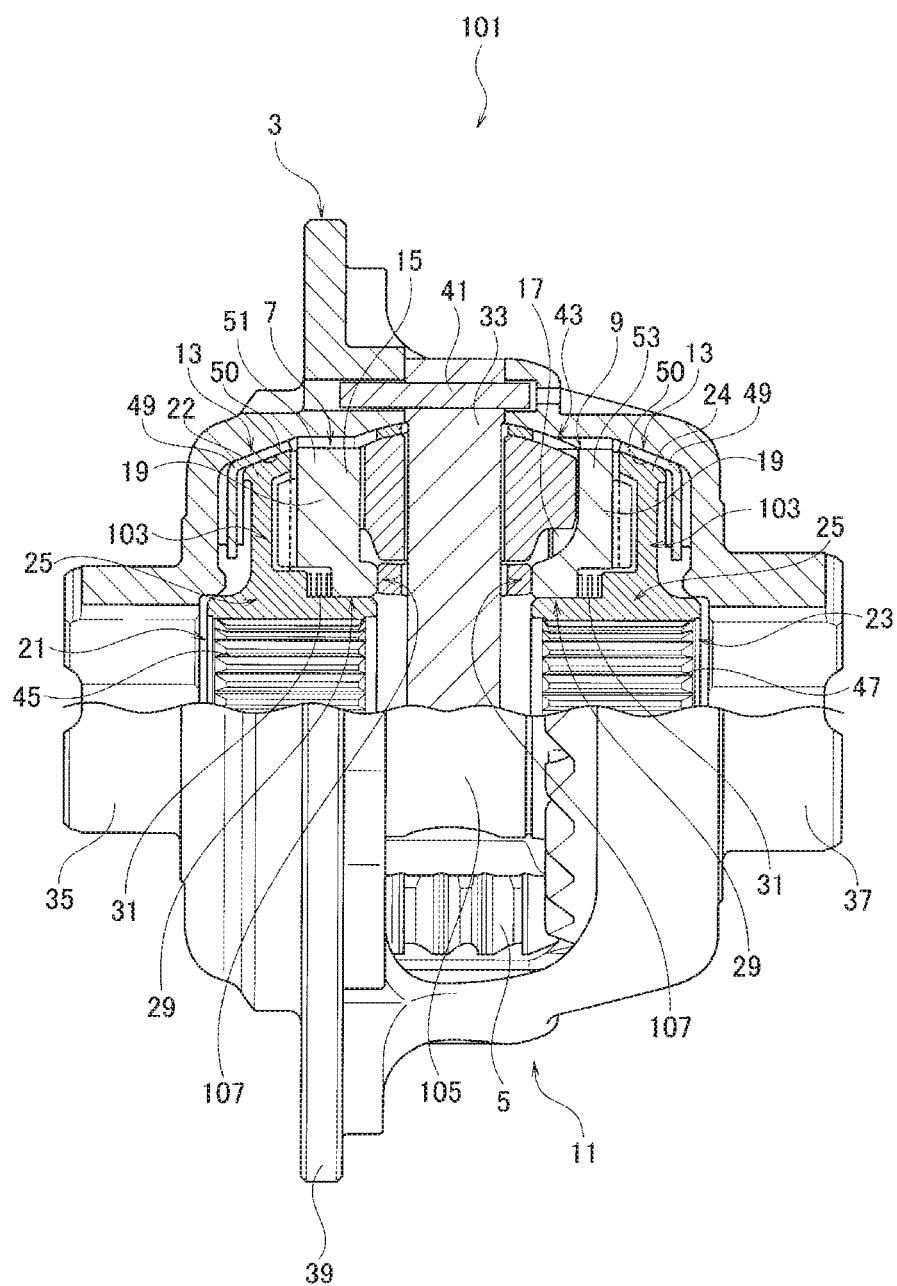
FIG. 7 is a cross sectional view of the differential apparatus according to the second embodiment.

As shown in FIGS. 6 and 7, the cam portion 103 is provided between the gear member 19 and the output member 25 in the axial direction.

The cam portion 103 includes a plurality of engagement projected portions which are provided in the circumferential direction and are projected to the axial direction from the gear member 19 toward the output member 25, and a plurality of engagement recessed portions which are provided in the circumferential direction and are engageable with the engagement projected portions on an axially opposing surface of the output member 25 with the gear member 19.

Because the cam portion 103 engages the plurality of engagement projected portions and the plurality of engagement recessed portions, the gear member 19 and the output member 25 can be integrally rotated.

In the cam portion 103, the engagement surfaces of the plurality of engagement projected portions and the plurality of engagement recessed portions in front and rear of the rotational direction are cam surfaces having inclination angles $\theta 1$ and $\theta 2$ inclined by a predetermined angle, so that the cam portion 103 is operated by the driving force branched and inputted to the pair of side gears 7, 9, and the output members 25, 25 are moved to the axial outer side.

By moving the output members 25, 25 in the axial direction, the sliding friction force between the sliding surfaces 50, 50 provided at tip ends of the flange portions 22, 24 of the output member 25 of the pair of side gears 7, 9 and the tapered rings 49, 49 are strengthened and the differential restricting force in the differential restricting portion 13 can be enhanced.

Such an output member 25 is provided with the output portions 21, 23 and the differential restricting portion 13, and the driving force from the pair of side gears 7, 9, along with the differential restricting force, is outputted to the output side member from the differential restricting portions 21, 23 of the output members 25, 25.

Accordingly, the differential restricting portion 13 is provided on the output member 25 including the output portions 21, 23 configured to output the driving force, and thereby the cam portion 103 is not disposed in a path which transmits the differential restricting force from the differential restricting portion 13 to the output portions 21, 23, and a transmission path of the differential restricting force can be completed only at the output member 25.

Therefore, the vibration in the cam portion 103 is not applied to the differential restricting force generated by the differential restricting portion 13, the driving force along with the differential restricting force can be directly outputted from the output portions 21, 23 of the output member 25, so that the transmission responsiveness of the driving force can be improved and differential restricting property can be stabilized.

At a space portion formed at an opposing surface between the inner diameter side of the radial flange portions 22, 24 at the radial direction of the gear member 19 and the output member 25 and the axial direction, the urging member 31 including a coil spring configured to urge the gear member 19 and the output member 25 in the axial direction is disposed, a preload is applied to the differential restricting portion 13 and backlashes of each member are prevented.

The thrust block 105 is disposed between the pair of side gears 7, 9 having such an output member 25 in the axial direction.

The thrust block 105 is formed in an annular shape, and the pinion shaft 33 is inserted through a center portion thereof. The thrust block 105 is disposed so as to be rotatable integrally with the differential case 3 between the pair of side gears 7, 9 in the axial direction.

Receiving portions 107, 107 are provided between an outer diameter side of the thrust block 105 and an inner diameter side of the gear members 19, 19 of the pair of side gears 7, 9.

In the receiving portions 107, 107, a cam thrust reaction force is generated at the cam portion 103. When the gear members 19, 19 are moved to the axial inner side, the thrust block 105 and the gear members 19, 19 come into contact with each other, and the thrust block 105 receives the cam thrust reaction force of the cam portion 103.

Here, in a case where the receiving portions configured to receive the cam thrust reaction force of the cam portion 103 are not provided between the pair of side gears 7, 9, the cam thrust reaction force generated by the cam portion 103 is received by the meshing portion 43 including the pinion 5 and the pair of side gears 7, 9.

By disposing the thrust block 105 configured to receive the cam thrust reaction force of the cam portion 103 between the pair of side gears 7, 9, the cam thrust reaction force of the cam portion 103 is not inputted to the meshing portion 43 and the strength of the gear portion of the pinion 5 and the gear portions 15, 17 of the pair of side gears 7, 9 can be appropriately maintained according to the meshing strength.

In such a differential apparatus 101, because the differential restricting portion 13 is provided on the output member 25 having the output portions 21, 23 engaged with the gear member 19 via the cam portion 103 rotatably and integrally, the differential restricting force generated by the differential restricting portion 13 is directly outputted from the output portions 21, 23 of the output member 25 without passing through the cam portion 103.

Therefore, in such a differential apparatus 101, the vibration generated in the cam portion 103 is not applied to the differential restricting force during a period when the differential restricting force is outputted from the output portions 21, 23, the transmission responsiveness of the driving force can be improved, and the differential restricting property can be stabilized.

In addition, because the thrust block 105 configured to receive the cam thrust reaction force of the cam portion 103 is disposed between the pair of side gears 7, 9, the cam thrust reaction force of the cam portion 103 is received by the thrust block 105, the cam thrust reaction force of the cam portion 103 is not inputted to the meshing portion 43 including the pinion 5 and the pair of side gears 7, 9, and the strength of the gear can be appropriately maintained.

Figure 8:
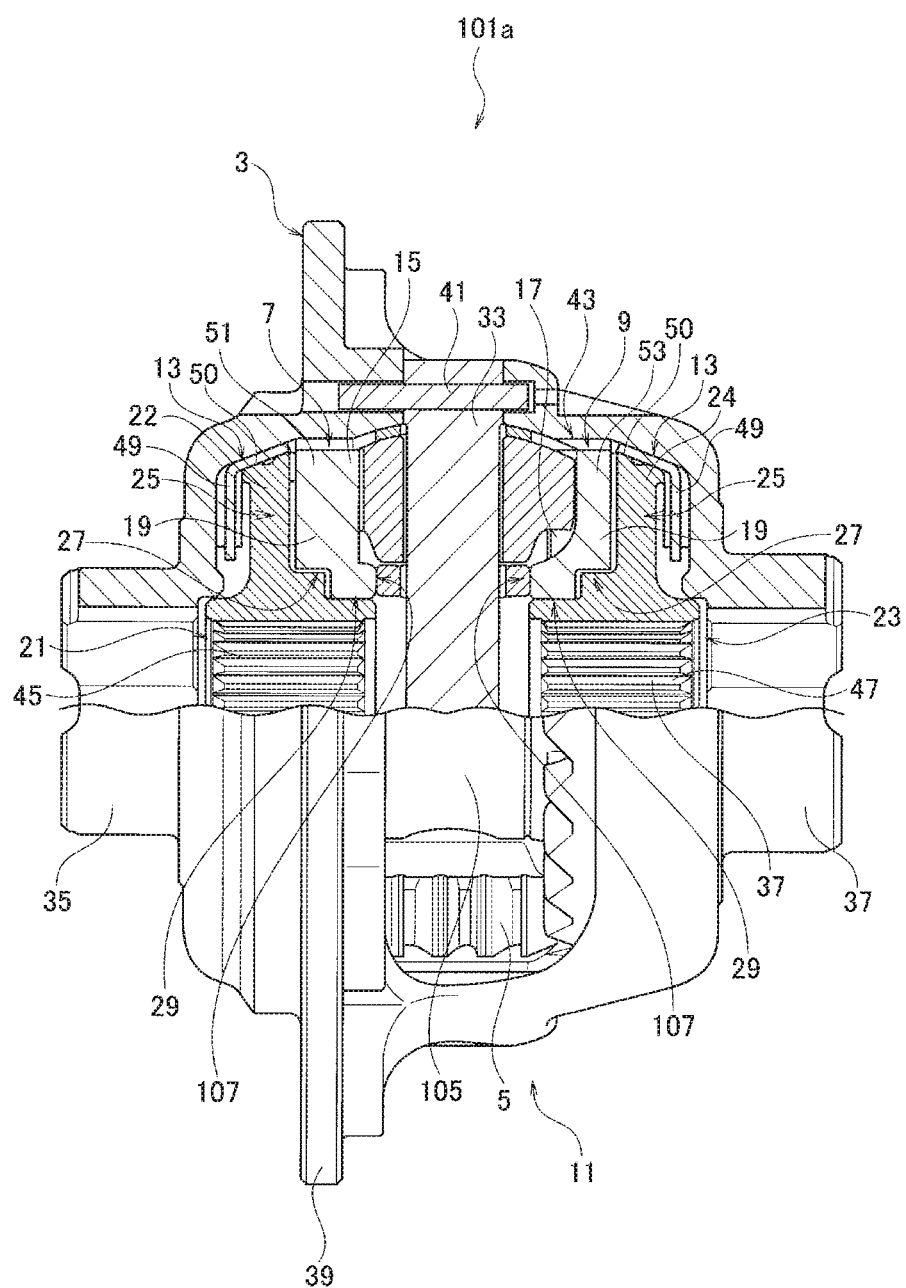
FIG. 8 is a cross sectional view showing another example of the differential apparatus according to the second embodiment.

As shown in FIG. 8, in a differential apparatus 101a in which the cam portion 27 is disposed between the gear member 19 and the output member 25 in the axial direction as in the first embodiment, the thrust block 105 configured to receive the cam thrust reaction force of the cam portion 27 may be disposed between the pair of side gears 7, 9.

Figure 9:
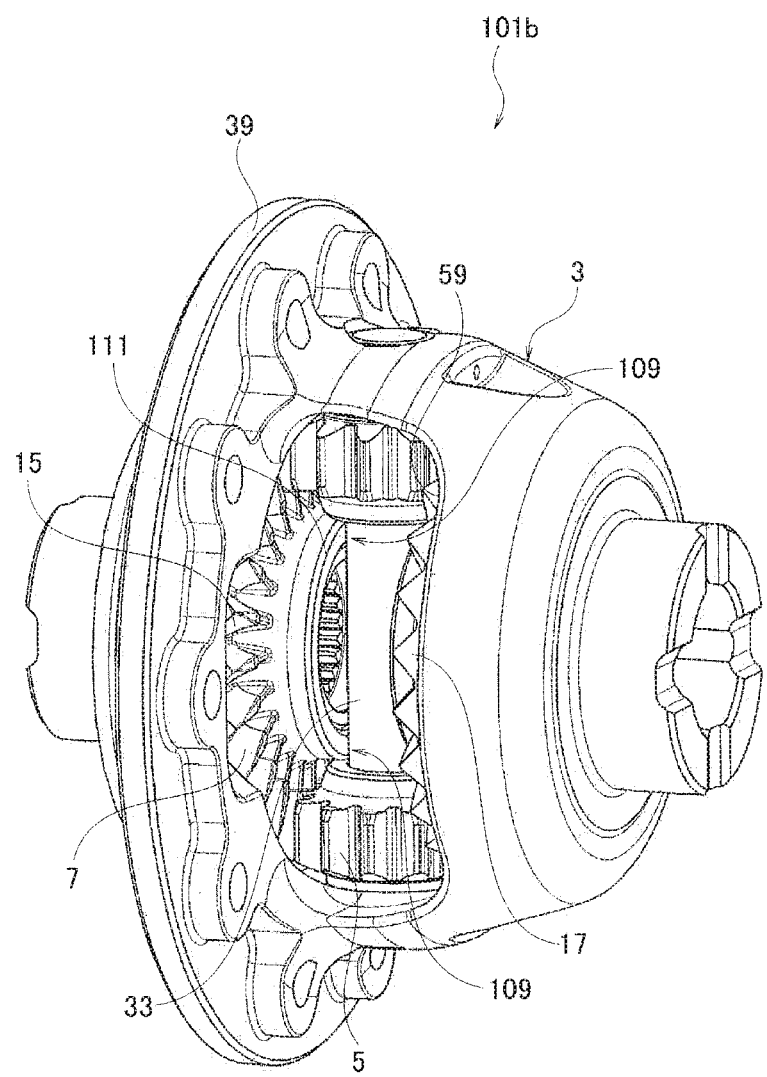
FIG. 9 is a perspective view showing another example of the differential apparatus according to the second embodiment.
Figure 10:
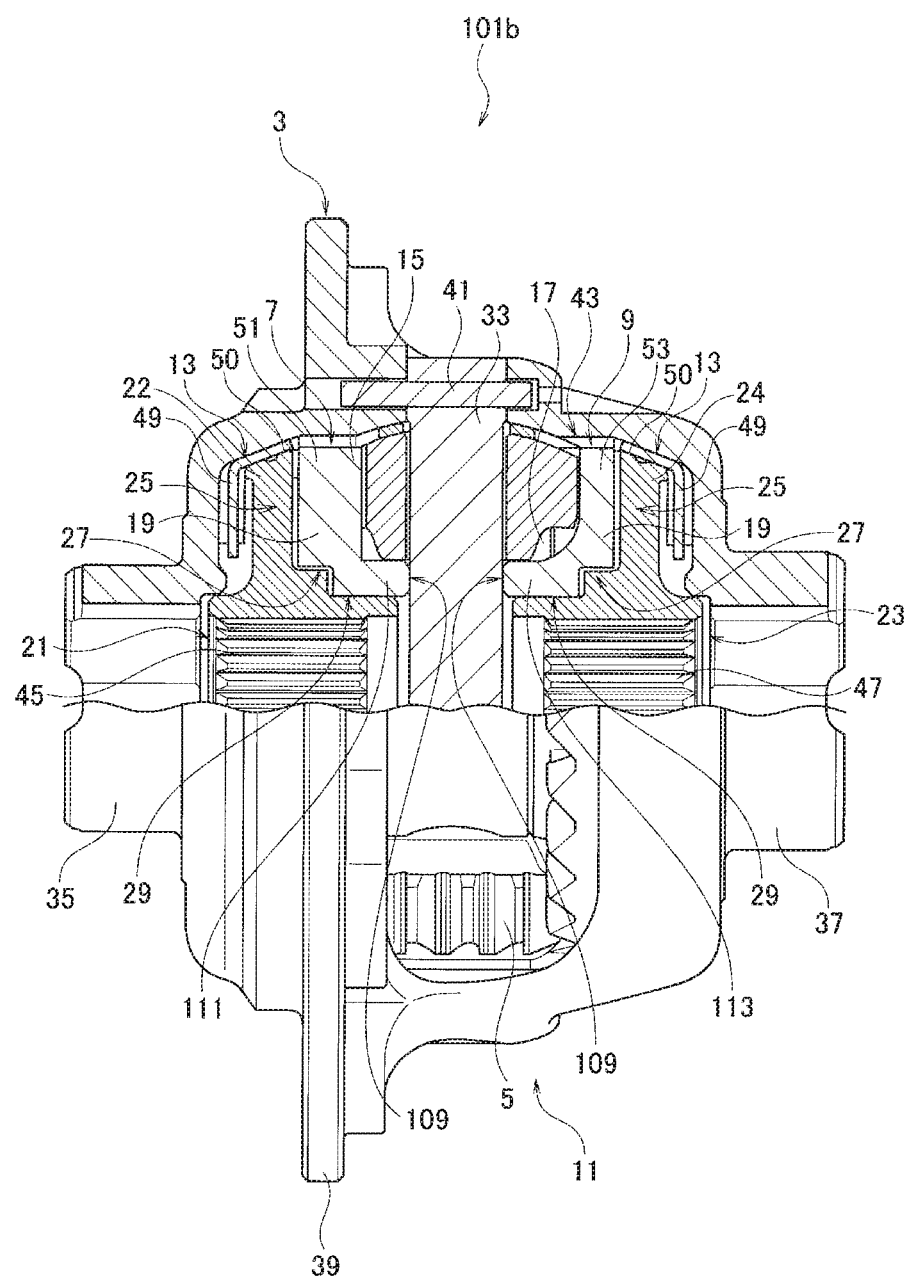
FIG. 10 is a cross sectional view showing another example of the differential apparatus according to the second embodiment.

In addition, as a structure for receiving the cam thrust reaction force of the cam portions 27, 103, receiving portions 109, 109 configured to receive the cam thrust reaction force of the cam portion 27 (the cam portion 103) may be provided between the pair of side gears 7, 9 and the pinion shaft 33, as in a differential apparatus 101b shown in FIGS. 9 and 10.

The receiving portions 109, 109 are provided between an outer circumferential surface of the pinion shaft 33 and an opposing surface of boss portions 111, 113 to the pinion shaft 33 extending to the axial inner side on the inner diameter side of the gear members 19, 19 of the pair of side gears 7, 9.

In such receiving portions 109, 109, the cam thrust reaction force is generated at the cam portion 27 (the cam portion 103). When the gear members 19, 19 are respectively moved to the axial inner side, the pinion shaft 33 comes into contact with the boss portions 111, 113 of the gear members 19, 19, and the pinion shaft 33 receives the cam thrust reaction force of the cam portion 27 (the cam portion 103).

Even with such receiving portions 109, 109, the cam thrust reaction force of the cam portion 27 (cam portion 103) is not inputted to the meshing portion 43, and the strength of the gear portion of the pinion 5 and the gear portions 15, 17 of the pair of side gears 7, 9 can be maintained.

(Third Embodiment)

A third embodiment will be described with reference to FIG. 11.

A differential apparatus 201 according to the third embodiment is provided with a contact portion 203 which is in contact with the gear member 19 in the differential case 3.

The same reference numerals are used for the same components as those of the other embodiments, and the description of the function refers to the other embodiments. Because the configuration is the same as that of the first embodiment, the operation and effect obtained are equivalent.

Figure 11:
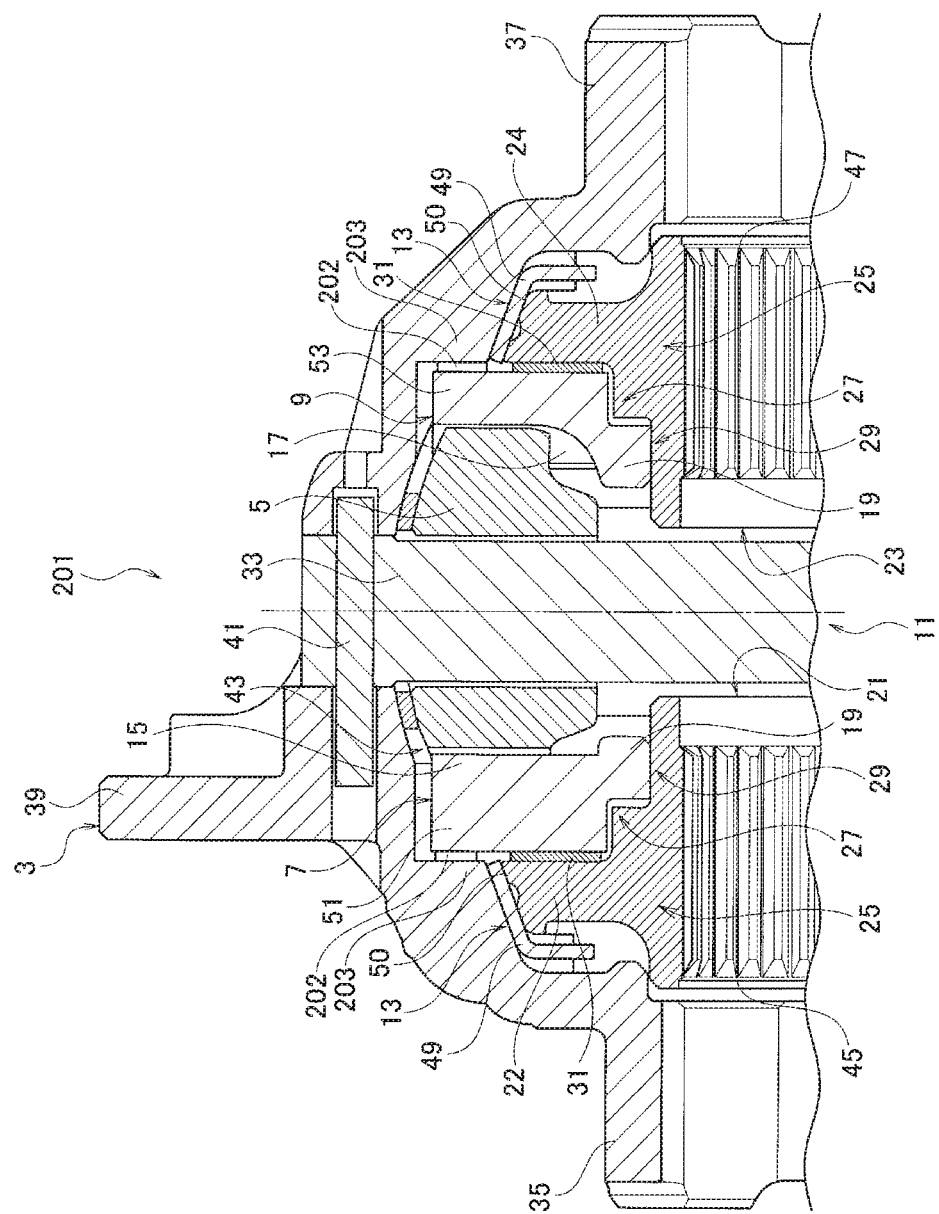
FIG. 11 is a cross sectional view of a differential apparatus according to a third embodiment.

As shown in FIG. 11, on the differential case 3, the contact portions 203, 203 are provided on a wall portion axially opposed to the gear members 19, 19 configuring the pair of side gears 7, 9.

The contact portions 203, 203 are positioned on the outer diameter side of the differential restricting portions 13, 13 of the differential case 3 so as to axially oppose the gear members 19, 19, and are in contact with the rear sides of the gear members 19, 19 in the axial direction via thrust washers 202, 202.

The thrust washers 202, 202 between the gear members 19, 19 and the contact portions 203, 203 may be thrust bearings which permit relative rotation therebetween.

When a meshing reaction force is generated between the pinion 5 and the pair of side gears 7, 9, such contact portions 203, 203 come into strong contact with the gear members 19, 19 by a movement of the gear members 19, 19 to the axial outer side, and receive the meshing reaction force of the pair of side gears 7, 9.

Here, the meshing reaction force between the pinion 5 and the pair of side gears 7, 9 is generated not only when the vehicle is driven by a driving force from a driving source but also by a power from a wheel side when the vehicle is traveling during deceleration of the vehicle or the like.

In a case where the meshing reaction force is generated between the pinion 5 and the pair of side gears 7, 9 by the power from the wheel side, it is desired to reduce the differential restricting torque caused by the differential restricting portion 13 to be as small as possible; while in a case where the meshing reaction force between the pinion 5 and the pair of side gears 7, 9 is inputted to the differential restricting portion 13, the differential restricting torque cannot be reduced.

Therefore, the meshing reaction force is not inputted to the differential restricting portion 13 by providing the contact portions 203, 203 configured to receive the meshing reaction force between the pinion 5 and the pair of side gears 7, 9 in the differential case 3.

Therefore, adjustment or generation of the differential restricting torque in the differential restricting portion 13 can be performed by adjusting only the cam portion 27, such as the inclination angle θ of the cam surface of the cam portion 27, and the intermittent property of the differential restricting portion 13 can be easily adjusted.

In such a differential apparatus 201, because the contact portion 203 in contact with the gear member 19 is provided on the differential case 3, the contact portion 203 receives the meshing reaction force between the pinion 5 and the pair of side gears 7, 9, the meshing reaction force is not inputted to the differential restricting portion 13, and the intermittent property of the differential restricting portion 13 can be easily adjusted by adjusting only the cam portion 27.

(Fourth Embodiment)

A fourth embodiment will be described with reference to FIGS. 12 and 13.

In a differential apparatus 301 according to the forth embodiment, the pinion 5 and the pair of side gears 7, 9 are configured by a bevel gear group.

The same reference numerals are used for the same components as those of the other embodiments, and the description of the function refers to the other embodiments. Because the configuration is the same as that of the first embodiment, the operation and effect obtained are equivalent.

Figure 12:
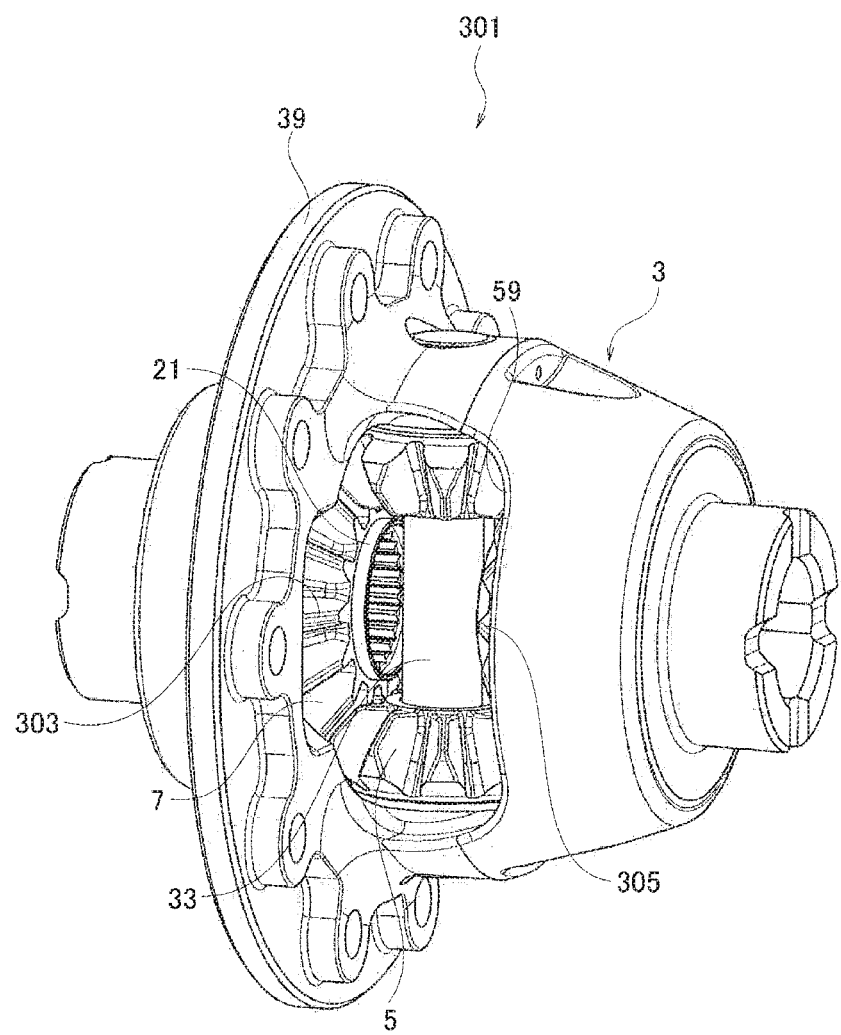
FIG. 12 is a perspective view of a differential apparatus according to a fourth embodiment.
Figure 13:
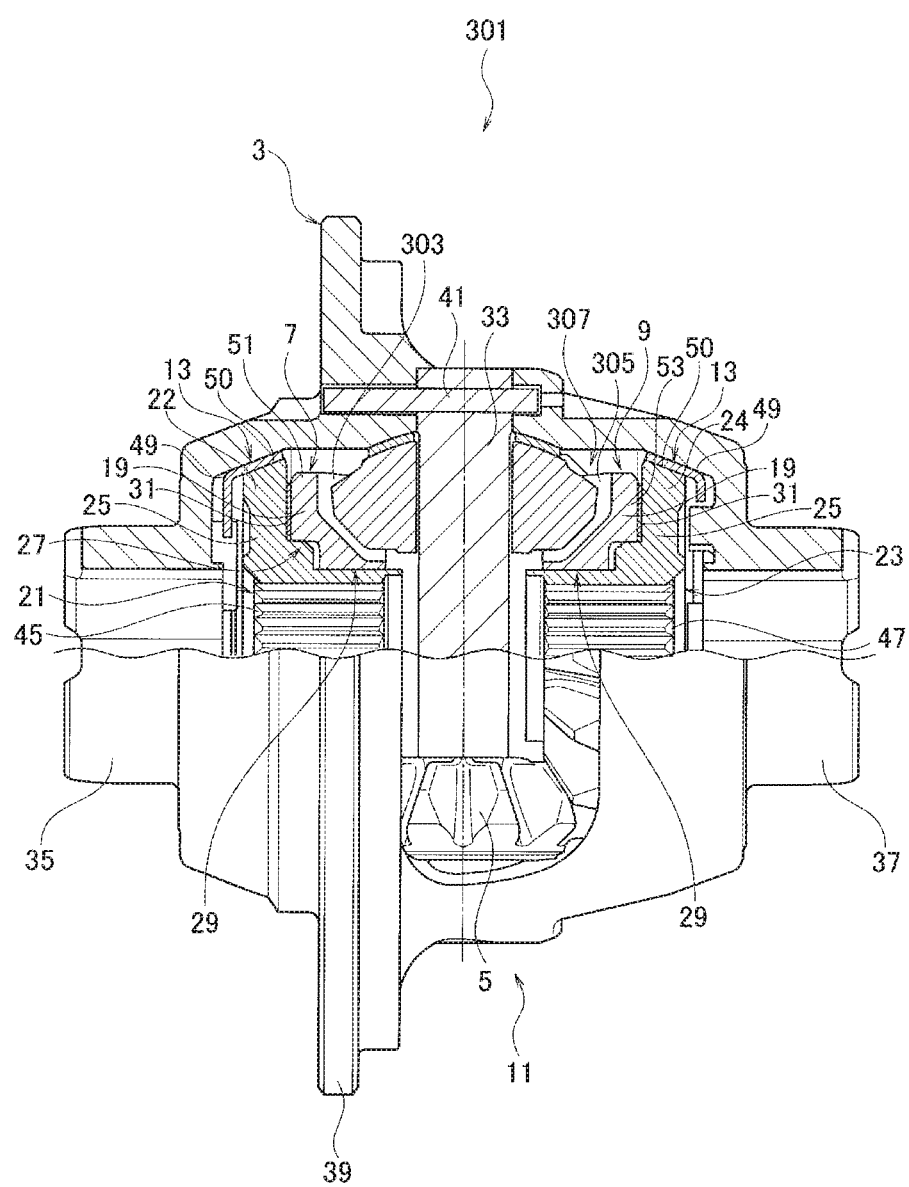
FIG. 13 is a cross sectional view of the differential apparatus according to the fourth embodiment.

As shown in FIGS. 12 and 13, a meshing portion 307 configured by the gear portion of the pinion 5 and gear portions 303, 305 of the pair of side gears 7, 9 is configured by a bevel gear group.

On the pair of side gears 7, 9 formed by this bevel gear, flange portions 51, 53 linearly extending in the radial direction are disposed on the rear sides of the gear portions 303, 305, similar to a case of being formed by a face gear group.

The cam portion 27 is disposed on the inner diameter sides of the gear portions 303, 305 and the flange portions 51, 53 of the pair of side gears 7, 9.

Specifically, when the gear portions 303, 305 and the flange portions 51, 53 of the side gears 7, 9 and the cam portion 27 are viewed from the radial direction, at least a part of axial positions of the gear portions 303, 305 and the flange portions 51, 53 of the side gears 7, 9 and an axial position of the cam portion 27 are disposed to overlap in the radial direction.

The flange portions 51, 53 are provided so as to expose outer circumferences of the gear portions 303, 305 to the opening 59 of the differential case 3 without the outer diameter side covering the outer circumferences of the gear portions 303, 305 in the circumferential direction.

Therefore, in a state where the pair of side gears 7, 9 are accommodated in the differential case 3, the pinion 5 can be accommodated from the opening 59 of the differential case 3 so as to mesh with the pair of side gears 7, 9, and the differential case 3 can be configured into a one-piece structure.

In such a differential apparatus 301, because the pinion 5 and the pair of side gears 7, 9 are configured by a bevel gear group, the versatility of the differential device 11 can be improved.

If the differential case 3 of the differential apparatus 301 is formed in a one-piece structure of a continuous member, each gear and the tapered rings 49, 49 are assembled inside the differential case 3 from the opening 59 even if the pinion 5 and the pair of side gears 7, 9 are configured by a bevel gear group. Therefore, the number of parts is reduced and the configuration is simplified, so that the differential apparatus 301 is further downsized.

Further, because the cam portion 27 is disposed on the inner diameter sides of the gear portions 303, 305 and the flange portions 51, 53 of the pair of side gears 7, 9, the cam portion 27 does not project to the axial outer sides of the gear portions 303, 305 of the pair of side gears 7, 9, and the differential apparatus 301 can be downsized in the axial direction.

(Fifth Embodiment)

A fifth embodiment will be described with reference to FIG. 14.

In a differential apparatus 501 according to the fifth embodiment, the differential case 3 is provided with reaction force receiving portions 503, 503 configured to receive a meshing reaction force between the pinion 5 and the pair of side gears 7, 9.

The same reference numerals are used for the same components as those of the other embodiments, and the description of the function refers to the other embodiments. Because the configuration is the same as that of the first embodiment, the operation and effect obtained are equivalent.

Figure 14:
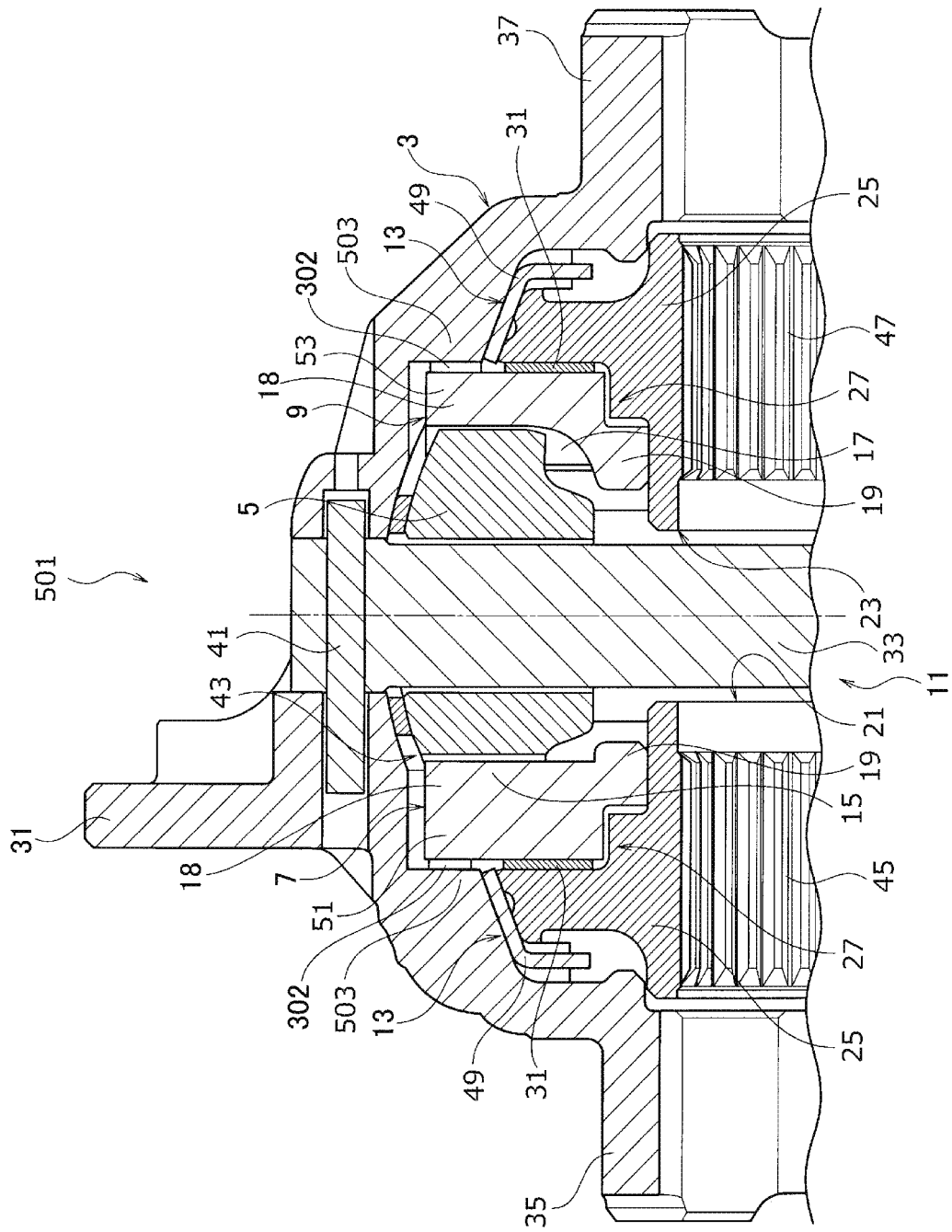
FIG. 14 is a cross sectional view of a differential apparatus according to a fifth embodiment.

As shown in FIG. 14, the pair of side gears 7, 9 include the gear member 19 provided with the gear portions 15, 17, and the output member 25 provided with the output portions 21, 23, and the gear member 19 and the output member 25 are rotatably and integrally engaged with each other via the cam portion 27.

The meshing portion 43 including the gear portion of the pinion 5 and the gear portions 15, 17 of the pair of side gears 7, 9 is configured by a face gear group.

According to the rotational state of the differential device 11, the output member 25 configuring the pair of side gears 7, 9 is moved in the axial direction by the cam thrust force of the cam portion 27 generated by the rotation of the pair of side gears 7, 9, and the differential restricting portion 13 is operated to restrict the differential operation of the differential device 11.

On the rear side of the gear members 19, 19 configuring the pair of side gears 7, 9, the reaction force receiving portions 503, 503 provided on the differential case 3 are disposed.

The reaction force receiving portions 503, 503 are wall portions which are positioned on the outer diameter sides of the differential restricting portions 13, 13 of the differential case 3 so as to oppose to the rear side of the gear members 19, 19 in the axial direction, and are in contact with the back rears of the gear members 19, 19 in the axial direction via thrust washers 302, 302.

The thrust washers 302, 302 between the gear members 19, 19 and the reaction force receiving portions 503, 503 may be thrust bearings which permit relative rotation therebetween.

When a meshing reaction force is generated between the pinion 5 and the pair of side gears 7, 9, the reaction force receiving portions 503, 503 come into strong contact with the gear members 19, 19 by a movement of the gear members 19, 19 in the axial direction, and receive the meshing reaction force of the pair of side gears 7, 9.

Here, the meshing reaction force between the pinion 5 and the pair of side gears 7, 9 is generated not only when the vehicle is driven by a driving force from a driving source but also by a power from a wheel side when the vehicle is traveling during deceleration of the vehicle or the like.

In a case where the meshing reaction force is generated between the pinion 5 and the pair of side gears 7, 9 by the power from the wheel side, it is desired to reduce the differential restricting torque caused by the differential restricting portion 13 as small as possible; while in a case where the meshing reaction force between the pinion 5 and the pair of side gears 7, 9 is inputted to the differential restricting portion 13, the differential restricting torque cannot be reduced.

Therefore, the meshing reaction force is not inputted to the differential restricting portion 13 by providing the reaction force receiving portions 503, 503 configured to receive the meshing reaction force between the pinion 5 and the pair of side gears 7, 9 in the differential case 3.

Therefore, adjustment or generation of the differential restricting torque in the differential restricting portion 13 can be performed by adjusting the cam thrust force only by setting the inclination angle θ of the cam surface of the cam portion 27, and the intermittent property of the differential restricting portion 13 can be easily adjusted.

In such a differential apparatus 501, because the differential case 3 is provided with the reaction force receiving portions 503, 503 configured to receive the meshing reaction force between the pinion 5 and the pair of side gears 7, 9, the meshing reaction force is not inputted to the differential restricting portion 13, and the intermittent property of the differential restricting portion 13 can be easily adjusted by adjusting only the cam portion 27.

(Sixth Embodiment)

A sixth embodiment will be described with reference to FIGS. 15 and 16.

In a differential apparatus 601 according to the sixth embodiment, receiving portions 403, 403 configured to receive the cam thrust reaction force of the cam portion 27 are provided between the pair of side gears 7, 9.

A thrust block 405 is disposed between the pair of side gears 7, 9, and the receiving portions 403, 403 are provided between the pair of side gears 7, 9 and the thrust block 405.

The same reference numerals are used for the same components as those of the other embodiments, and the description of the function refers to the other embodiments. Because the configuration is the same as that of the first embodiment, the operation and effect obtained are equivalent.

Figure 15:
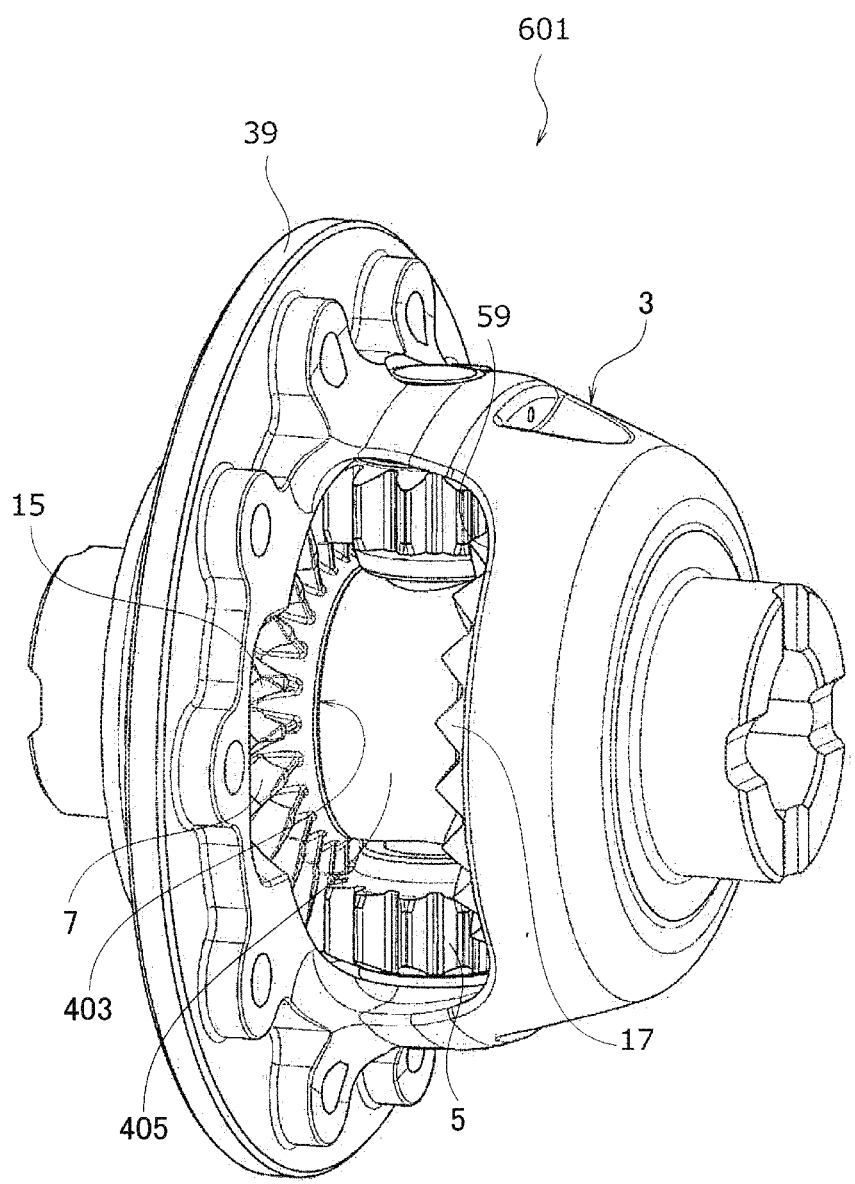
FIG. 15 is a perspective view of a differential apparatus according to a sixth embodiment.
Figure 16:
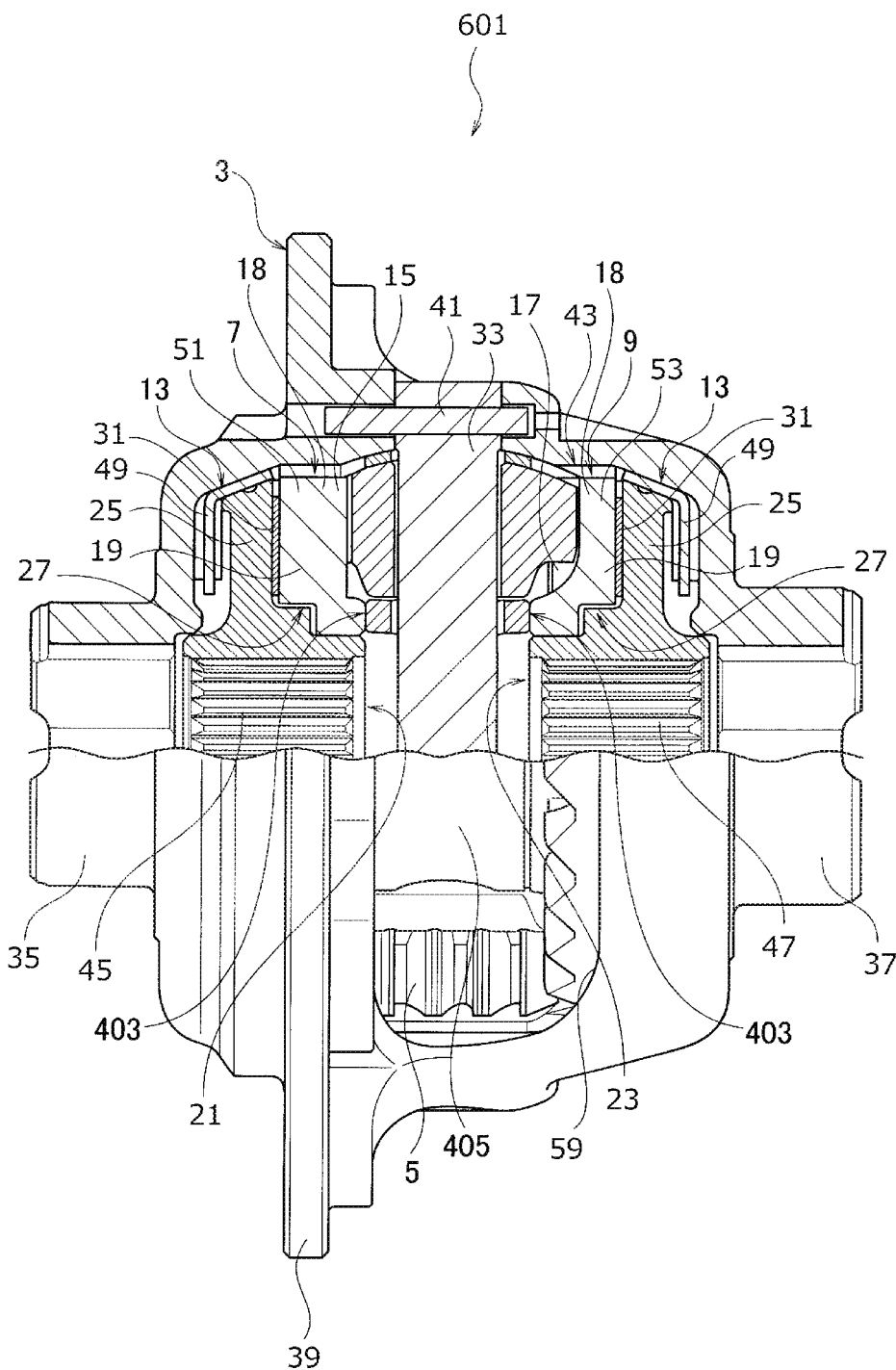
FIG. 16 is a cross sectional view of the differential apparatus according to the sixth embodiment.

As shown in FIGS. 15 and 16, the thrust block 405 is disposed between the pair of side gears 7, 9 in the axial direction, and regulation of the thrust block 405 in the radial direction is performed on tip end surfaces of a pair of pinions 5, 5.

The meshing portion 43 including the gear portion of the pinion 5 and the gear portions 15, 17 of the pair of side gears 7, 9 is configured by a face gear group.

The thrust block 405 is formed in an annular shape, and the pinion shaft 33 is inserted through a center portion thereof. The thrust block 105 is disposed so as to be rotatable integrally with the differential case 3 between the pair of side gears 7, 9 in the axial direction.

The receiving portions 403, 403 are provided between an outer diameter side of the thrust block 405 and an inner diameter side of the gear members 19, 19 of the pair of side gears 7, 9.

In the receiving portions 403, 403, a cam thrust reaction force is generated at the cam portion 27. When the gear members 19, 19 are moved to the axial inner side, the thrust block 405 and the gear members 19, 19 come into contact with each other, and the thrust block 405 receives the cam thrust reaction force of the cam portion 27. In addition, the receiving portions 403, 403 are disposed along the axial direction of the cam portion 27.

Here, in a case where the receiving portions configured to receive the cam thrust reaction force of the cam portion 27 are not provided between the pair of side gears 7, 9, the cam thrust reaction force generated by the cam portion 27 is received by the meshing portion 43 including the pinion 5 and the pair of side gears 7, 9.

Accordingly, when the cam thrust reaction force of the cam portion 27 is received by the meshing portion 43, there are concerns that the strength and durability of the gear deteriorate, such as deformation and wearing of the gear portion of the pinion 5 and the tooth surfaces of the gear portions 15, 17 of the pair of side gears 7, 9, and considering the sufficient strength and durability, it is necessary to increase the thickness and size of each member.

Therefore, by providing the receiving portions 403, 403 configured to receive the cam thrust reaction force of the cam portion 27 between the pair of side gears 7, 9, the cam thrust reaction force of the cam portion 27 is not inputted to the meshing portion 43 and the strength of the gear portion of the pinion 5 and the gear portions 15, 17 of the pair of side gears 7, 9 can be maintained.

In such a differential apparatus 601, because the receiving portions 403, 403 configured to receive the cam thrust reaction force of the cam portion 27 are provided between the pair of side gears 7, 9, the cam thrust reaction force of the cam portion 27 is not inputted to the meshing portion 43 including the pinion 5 and the pair of side gears 7, 9, and the strength of the gear would be maintained.

In addition, because the receiving portions 403, 403 are provided between the pair of side gears 7, 9 and the thrust block 405, the thrust block 405 can stably receive the cam thrust reaction force of the cam portion 27, and the cam thrust reaction force can be reliably prevented from being inputted to the meshing portion 43 including the pinion 5 and the pair of side gears 7, 9.

Further, because the receiving portions 403, 403 are disposed along the axial direction of the cam portion 27, the cam thrust reaction force is linearly transmitted in the axial direction, and when in contact with the thrust block 405, deformation or partial wearing of the circumferential shape of the cam portion 27 on the side gears 7, 9 can be prevented from occurring.

(Seventh Embodiment)

A seventh embodiment will be described with reference to FIGS. 17 and 18.

In a differential apparatus 701 according to the seventh embodiment, the receiving portions 503, 503 are provided between the pair of side gears 7, 9 and the pinion shaft 33.

The same reference numerals are used for the same components as those of the other embodiments, and the description of the function refers to the other embodiments. Because the configuration is the same as that of the first embodiment, the operation and effect obtained are equivalent.

Figure 17:
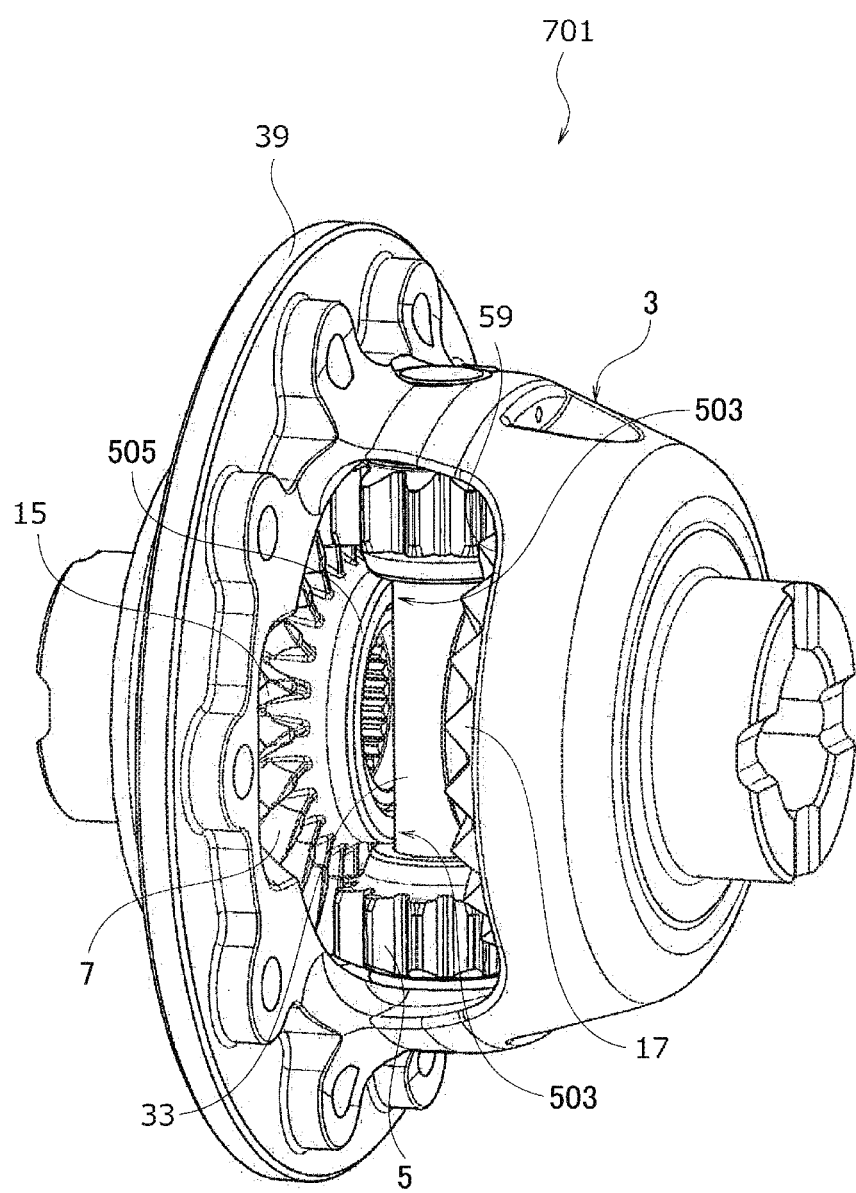
FIG. 17 is a perspective view of a differential apparatus according to a seventh embodiment.
Figure 18:
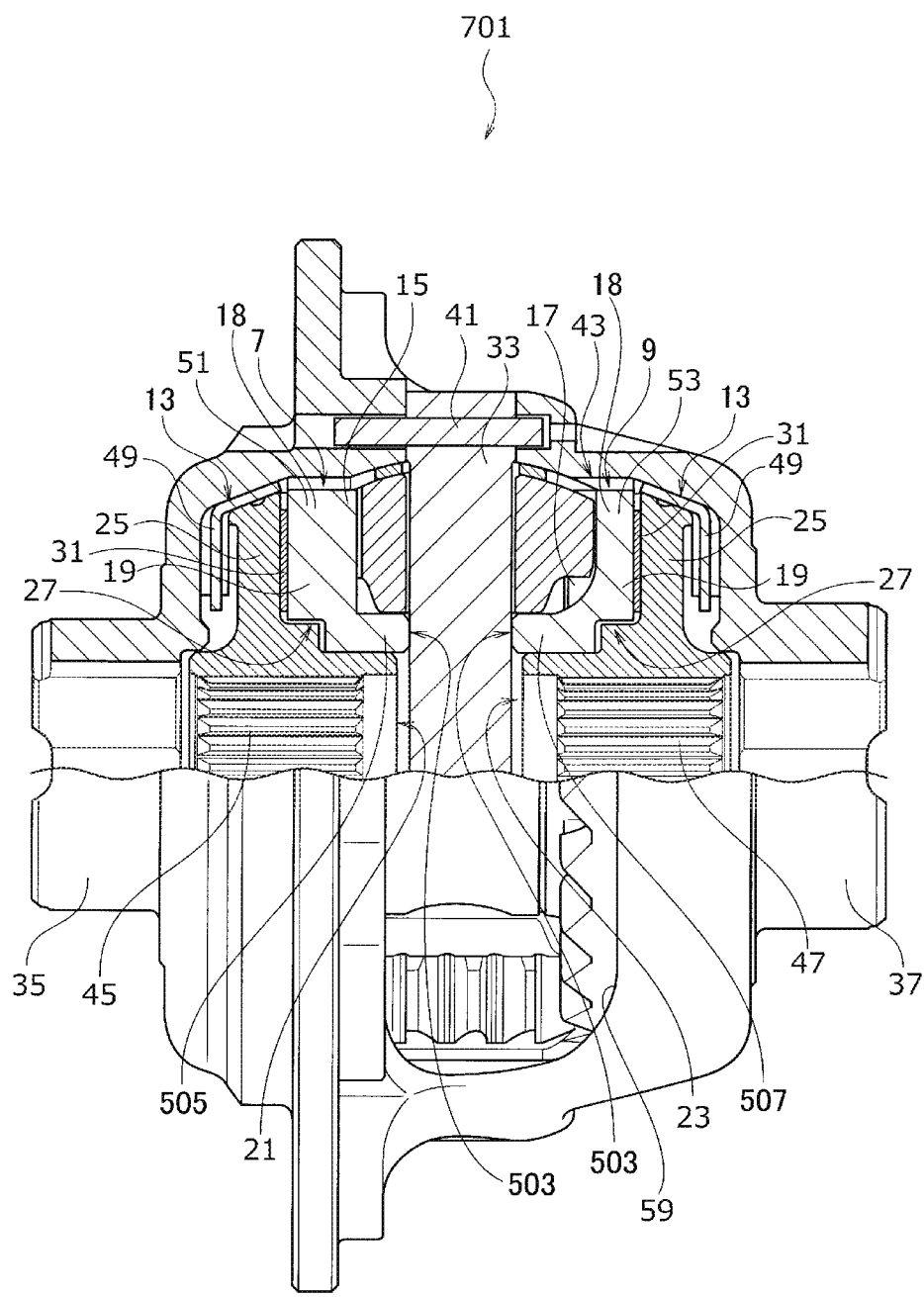
FIG. 18 is a cross sectional view of the differential apparatus according to the seventh embodiment.

As shown in FIGS. 17 and 18, the receiving portions 503, 503 are provided between the pair of side gears 7, 9 and the pinion shaft 33 in the axial direction.

The meshing portion 43 including the gear portion of the pinion 5 and the gear portions 15, 17 of the pair of side gears 7, 9 is configured by a face gear group.

The receiving portions 503, 503 are provided between an outer circumferential surface of the pinion shaft 33 and an opposing surface of boss portions 505, 507 to the pinion shaft 33 extending to the axial inner side on the inner diameter side of the gear members 19, 19 of the pair of side gears 7, 9. In addition, the receiving portions 503, 503 are disposed along the axial direction of the cam portion 27.

In such receiving portions 503, 503, the cam thrust reaction force is generated at the cam portion 27. When the gear members 19, 19 are respectively moved to the axial inner side, the pinion shaft 33 comes into contact with the boss portions 505, 507 of the gear members 19, 19, and the pinion shaft 33 receives the cam thrust reaction force of the cam portion 27.

Accordingly, by providing the receiving portions 503, 503 between the pair of side gears 7, 9 and the pinion shaft 33, the cam thrust reaction force of the cam portion 27 is not inputted to the meshing portion 43 and the strength of the gear portion of the pinion 5 and the gear portions 15, 17 of the pair of side gears 7, 9 can be maintained.

In such a differential apparatus 701, because the receiving portions 503, 503 are provided between the pair of side gears 7, 9 and the pinion shaft 33, a separate member is not used, the cam thrust reaction force of the cam portion 27 is not inputted to the meshing portion 43 including the pinion 5 and the pair of side gears 7, 9, and the strength of the gear can be maintained.

Further, because the receiving portions 503, 503 are disposed along the axial direction of the cam portion 27, the cam thrust reaction force is linearly transmitted in the axial direction, and when in contact with the pinion shaft 33, deformation or partial wear can be prevented from occurring in the circumferential shape of the cam portion 27, such as the boss portions 505, 507 of the gear members 19, 19.

(Eighth Embodiment)

An eighth embodiment will be described with reference to FIG. 19.

In a differential apparatus 801 according to the eight embodiment, differential restricting members 803, 803 configuring the differential restricting portion 13 are disposed on the rear sides of the pair of side gears 7, 9.

The cam portion 27 is disposed between the pair of side gears 7, 9 and the differential restricting members 803, 803.

The same reference numerals are used for the same components as those of the other embodiments, and the description of the function refers to the first embodiment. Because the configuration is the same as that of the first embodiment, the operation and effect obtained are equivalent.

Figure 19:
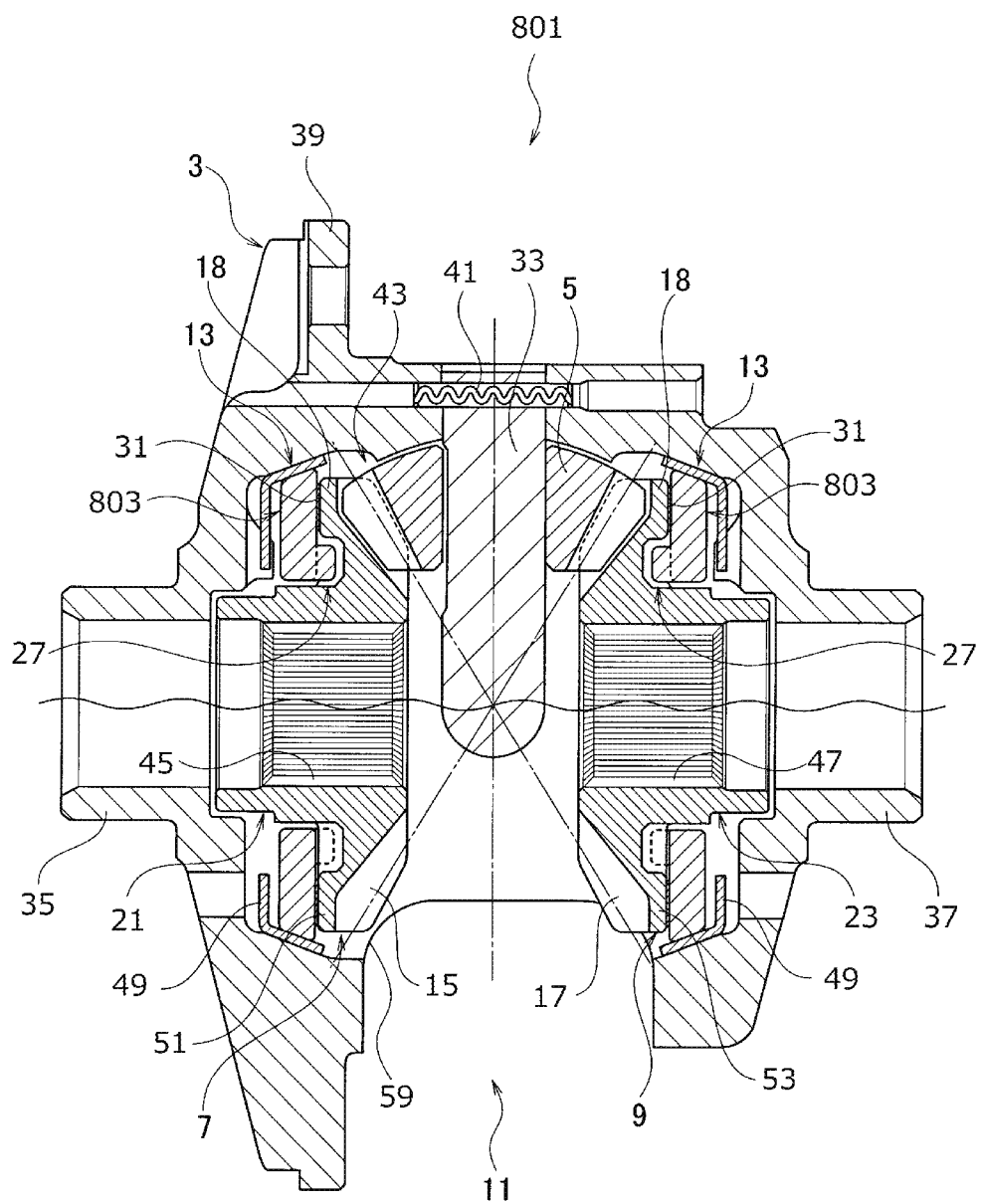
FIG. 19 is a cross sectional view of a differential apparatus according to an eighth embodiment.

As shown in FIG. 19, in the pair of side gears 7, 9, the gear portions 15, 17 and the output portions 21, 23 are formed of a continuous member.

The meshing portion 43 including the gear portion of the pinion 5 and the gear portions 15, 17 of the pair of side gears 7, 9 is configured by a bevel gear group.

The differential restricting members 803, 803 are disposed on the rear sides of the gear portions 15, 17 of the pair of side gears 7, 9.

The differential restricting members 803, 803 are in an annular shape, and are disposed between the pair of side gears 7, 9 and the tapered ring 49, 49 as friction members in the axial direction, at the rear sides of the gear portions 15, 17 of the pair of side gears 7, 9 and on the outer diameter sides of the output portions 21, 23.

The differential restricting members 803, 803, together with the tapered rings 49, 49 configure the differential restricting portions 13, 13, and according to the rotational state of the differential device 11, are axially moved by the pair of side gears 7, 9 moved by the meshing reaction force against the pinion 5, slide with the tapered rings 49, 49, and restrict the differential operation of the differential device 11.

A plurality of recessed cam surfaces are formed in the circumferential direction on the rear sides of the pair of side gears 7, 9, and a plurality of projected cam surfaces are formed in the circumferential direction at the axial end portion on the inner diameter side of the differential differential restricting members 803, 803. The recessed cam surfaces and the projected cam surfaces are engaged with each other with an inclination angle of θ1 on a normal rotation side and an inclination angle of θ2 on a reverse rotation side in the rotational direction.

Such differential restricting members 803, 803 are integrally and rotatably engaged with the pair of side gears 7, 9 via the cam portion 27, are axially moved by the cam thrust force of the cam portion 27, and strengthen the differential restricting force in the differential restricting portion 13.

The cam portion 27 is disposed on the inner diameter sides of the gear portions 15, 17 and the flange portions 51, 53 of the pair of side gears 7, 9.

Specifically, when the gear portions 15, 17 and the flange portions 51, 53 of the side gears 7, 9 and the cam portion 27 are viewed from the radial direction, at least a part of axial positions of the gear portions 15, 17 and the flange portions 51, 53 of the side gears 7, 9 and an axial position of the cam portion 27 are disposed to overlap in the radial direction.

Accordingly, by disposing the cam portion 27, the cam portion 27 does not project to the axial outer side of the gear portions 15, 17 of the pair of side gears 7, 9, so that the differential apparatus 801 can be downsized in the axial direction.

In addition, by positioning the flange portions 51, 53 on the outer diameter side of the cam portion 27, deformation of the cam portion 27 can be prevented and the cam thrust force can be stably generated at the cam portion 27.

Further, because the differential case 3 of the differential apparatus 801 is formed in a one-piece structure of a continuous member, the pinion 5 and the pair of side gears 7, 9 are configured by a bevel gear group. However, because each gear, the differential restricting members 803, 803 and the tapered rings 49, 49 are assembled inside the differential case 3 from the opening 59, the number of parts is small, and the configuration is simplified. Thus, the differential apparatus 101 can be further downsized.

In such a differential apparatus 801, because the cam portion 27 is disposed between the pair of side gears 7, 9 and the differential restricting members 803, 803, the cam portion 27 does not project to the axial outer side of the gear portions 15, 17 of the side gears 7, 9, and the differential apparatus 801 can be downsized even in a case where the differential restricting members 803, 803 are disposed on the rear sides of the pair of side gears 7, 9.

In the differential apparatus according to the embodiments of the present invention, the tapered ring is disposed between the differential case and the output gear in the differential restricting portion. However, the present disclosure is not limited thereto. The differential case and the output gear may be slid without disposing a tapered ring between the differential case and the output gear. As the friction member, other friction members such as a flat disk can be used without being limited to the tapered ring.

In a structure in which the cam portion is provided between the gear member and the output member in the radial direction, an example in which the differential gear and the output gear are configured by a bevel gear group is shown. However, the present disclosure is not limited thereto. The differential gear and the output gear may also be configured by a bevel gear group even in a structure in which the cam portion is provided between the gear member and the output member in the axial direction.

In addition, the cam portion 27 may be disposed only on one of the pair of side gears 7, 9.

Further, by setting the inclination cam angles of θ1 in the normal rotation (vehicle forward) direction and θ2 in the reverse rotation (vehicle backward) direction with respect to the engagement surfaces in the rotational direction of the plurality of engagement recessed portion 55 and the plurality of engagement projected portion 57 in the cam portion 27, the differential restricting force of the differential apparatus is made different depending on the forward and backward movement of the vehicle.

If such a differential apparatus having such asymmetric differential restricting properties is small and lightweight, and can be made into a product at a low cost, steering stability can be improved in vehicles in many fields such as FF-based sports vehicles, general vehicles, and electric motor-driven vehicles.

What is claimed is:

1. A differential apparatus, comprising:
a differential device; and
differential restricting portions configured to restrict a differential operation of the differential device,
wherein the differential device includes a differential case which is rotatably disposed, a differential gear which is rotatable while being supported by the differential case and revolves by rotation of the differential case, and a pair of output gears which are meshed with the differential gear and are rotatable relative to each other,
wherein the pair of output gears includes a first output gear and a second output gear,
wherein the first output gear includes a first gear member provided with a first gear portion and a first output member including an output portion configured to output a driving force inputted to the first output gear,
wherein the second output gear includes a second gear member provided with a second gear portion and a second output member including an output portion configured to output a driving force inputted to the second output gear,
wherein a first cam portion is provided between the first gear member and the first output member,
wherein a second cam portion is provided between the second gear member and the second output member,
wherein the differential restricting portions are provided between the differential case and the first output member and between the differential case and the second output member,
wherein the first gear portion and the second gear portion are located between the first cam portion and the second cam portion,
wherein the first gear member comprises a first support portion that supports the first gear member and the first output member in a radial direction and that is provided between the first gear member and the first output member, and
wherein the second gear member comprises a second support portion that supports the second gear member and the second output member in a radial direction and that is provided between the second gear member and the second output member.

2. The differential apparatus according to claim 1, wherein the differential case is provided with a first contact portion in contact with the first gear member and a second contact portion in contact with the second gear member.

3. The differential apparatus according to claim 1, wherein a first urging member that urges the first gear member and the first output member in an axial direction is disposed between the first gear member and the first output member, and a second urging member that urges the second gear member and the second output member in an axial direction is disposed between the second gear member and the second output member.

4. The differential apparatus according to claim 1, wherein a thrust block configured to receive a cam thrust reaction force of the cam portion is disposed between the first and second output gears.

5. The differential apparatus according to claim 1, wherein the cam portions are configured to actuate the differential restricting portions with driving forces inputted to the output gears, and
wherein the cam portions are disposed on an inner diameter side of the gear portions of the output gears.

6. The differential apparatus according to claim 1, wherein the first cam portion is disposed on an outer diameter side of the output portion at an axial intermediate position of the output portion of the first output gear, and the second cam portion is disposed on an outer diameter side of the output portion at an axial intermediate position of the output portion of the second output gear.

7. The differential apparatus according to claim 1, wherein flange portions extending in the radial direction are respectively provided on a rear side of the first gear portion of the first output gear and on a rear side of the second gear portion of the second output gear, and
   wherein the flange portions are disposed on an outer diameter side of the cam portions.

8. The differential apparatus according to claim 1, wherein a differential restricting member configuring the differential restricting portion is disposed on a rear side of the first output gear, and
   wherein the first cam portion is disposed between the first output gear and the differential restricting member.

9. The differential apparatus according to claim 1, wherein a receiving portion configured to receive the cam thrust reaction force of the cam portions is provided between the first and second output gears.

10. The differential apparatus according to claim 9, wherein a thrust block is disposed between the first and second output gears, and
   wherein the receiving portion is provided between the first output gear and the thrust block.

11. The differential apparatus according to claim 9, wherein the differential device includes a pinion shaft disposed to be rotatable integrally with the differential case and supporting the differential gear to be rotatable, and
   wherein the receiving portion is provided between the first output gear and the pinion shaft.

12. A differential apparatus, comprising:
a differential device; and
a differential restricting portion configured to restrict a differential operation of the differential device,
wherein the differential device includes a differential case which is rotatably disposed, a differential gear which is rotatable about an axis while being supported by the differential case and revolves by rotation of the differential case, and a pair of output gears which are meshed with the differential gear and are rotatable relative to each other,
wherein each of the output gears includes a gear member provided with a gear portion and an output member including an output portion configured to output a driving force inputted to the output gear,
wherein a cam portion is provided between the gear member and the output member,
wherein the differential restricting portion is provided between the differential case and the output members,
wherein the output member moves to an axial outer side relative to the axis when the cam portion is operated, and
wherein the cam portion is disposed on an outer diameter side of the output portion at an axial intermediate position of the output portion of the output gear.

* * * * *